(12) United States Patent
Gathala et al.

(10) Patent No.: US 12,321,314 B2
(45) Date of Patent: *Jun. 3, 2025

(54) FILE-LEVEL SNAPSHOT ACCESS SERVICE

(71) Applicant: Amazon Technologies, Inc., Seattle, WA (US)

(72) Inventors: Anil Gathala, San Jose, CA (US); Sandeep Kumar, Sammamish, WA (US); Kiran Shantaram Dalvi, Sunnyvale, CA (US); Chakravarthi Kalyana Valicherla, Redmond, WA (US); Shailendra Verma, Bellevue, WA (US); Adonijah Park, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,747

(22) Filed: Dec. 27, 2023

(65) Prior Publication Data

US 2024/0184745 A1 Jun. 6, 2024

Related U.S. Application Data

(63) Continuation of application No. 17/217,957, filed on Mar. 30, 2021, now Pat. No. 12,032,516.

(51) Int. Cl.
*G06F 11/14* (2006.01)
*G06F 9/54* (2006.01)
(Continued)

(52) U.S. Cl.
CPC ............ *G06F 16/128* (2019.01); *G06F 9/541* (2013.01); *G06F 11/1451* (2013.01);
(Continued)

(58) Field of Classification Search
CPC .... G06F 16/128; G06F 9/541; G06F 11/1451; G06F 16/172; G06F 2201/80; G06F 2201/84

See application file for complete search history.

(56) References Cited

U.S. PATENT DOCUMENTS

| | | |
|---|---|---|
| 5,815,649 A | 9/1998 | Utter et al. |
| 7,953,947 B2 | 5/2011 | Akutsu et al. |

(Continued)

OTHER PUBLICATIONS

U.S. Appl. No. 17/217,957, filed Mar. 30, 2021, Anil Gathal, et al.

*Primary Examiner* — Maher N Algibhah
(74) *Attorney, Agent, or Firm* — Alexander A. Knapp; Kowert, Hood, Munyon, Rankin & Goetzel, P.C.

(57) ABSTRACT

A file-level snapshot access service provides direct access to individual files included in a snapshot for virtual volume of a block-storage service without requiring a volume to be re-created from the snapshot, attached to a computing device, or mounted in a file system. For example, a user/client may directly retrieve individual files from specified snapshots via a user interface/API of the file-level snapshot access service. Additionally, the file-level snapshot access service is configured to provide a listing of files included in a given snapshot. In some embodiments, a file-level snapshot access service may provide direct access to individual files included in snapshots generated for other types of storage systems, such as an object-based storage system.

20 Claims, 15 Drawing Sheets

(51) Int. Cl.
*G06F 16/11* (2019.01)
*G06F 16/172* (2019.01)

(52) U.S. Cl.
CPC ........ *G06F 16/172* (2019.01); *G06F 2201/80* (2013.01); *G06F 2201/84* (2013.01)

(56) References Cited

U.S. PATENT DOCUMENTS

| | | | |
|---|---|---|---|
| 8,307,154 B2 | 11/2012 | Stabrawa et al. | |
| 8,321,642 B1 | 11/2012 | Anzai et al. | |
| 8,595,191 B2 | 11/2013 | Prahlad et al. | |
| 8,789,208 B1 | 7/2014 | Sundaram et al. | |
| 9,275,124 B2 | 3/2016 | Sundaram et al. | |
| 9,304,867 B2 | 4/2016 | Sivasubramanian et al. | |
| 9,405,483 B1 | 8/2016 | Wei et al. | |
| 9,792,060 B2 | 10/2017 | Wei et al. | |
| 9,886,213 B2 | 2/2018 | Sivasubramanian et al. | |
| 9,916,321 B2 | 3/2018 | Sundaram et al. | |
| 10,452,296 B1 | 10/2019 | Greenwood | |
| 10,481,983 B1 * | 11/2019 | Miah | G06F 16/128 |
| 11,336,685 B1 | 5/2022 | Rodriguez | |
| 11,681,443 B1 | 6/2023 | Venugopal | |
| 2005/0216788 A1 * | 9/2005 | Mani-Meitav | G06F 11/1464 714/E11.122 |
| 2006/0155946 A1 | 7/2006 | Ji | |
| 2010/0076932 A1 | 3/2010 | Lad | |
| 2012/0054156 A1 | 3/2012 | Mason, Jr. | |
| 2012/0079221 A1 | 3/2012 | Sivasubramanian et al. | |
| 2012/0290802 A1 | 11/2012 | Wade et al. | |
| 2013/0007389 A1 | 1/2013 | Patterson et al. | |
| 2013/0166831 A1 | 6/2013 | Atkisson et al. | |
| 2014/0330784 A1 | 11/2014 | Sundaram et al. | |
| 2016/0004601 A1 | 1/2016 | Ahn | |
| 2016/0070741 A1 | 3/2016 | Lin | |
| 2016/0179839 A1 | 6/2016 | Sundaram et al. | |
| 2016/0210342 A1 | 7/2016 | Vallabhaneni | |
| 2016/0216896 A1 | 7/2016 | Sivasubramanian et al. | |
| 2016/0328168 A1 | 11/2016 | Wei et al. | |
| 2017/0147441 A1 | 5/2017 | Binford | |
| 2018/0196827 A1 | 7/2018 | Sundaram | |
| 2019/0163580 A1 | 5/2019 | Pandey | |
| 2020/0218615 A1 | 7/2020 | Silk | |
| 2021/0303405 A1 | 9/2021 | Slater | |

* cited by examiner

FILE-LEVEL SNAPSHOT ACCESS SERVICE

PRIORITY APPLICATION

This application is a continuation of U.S. patent application Ser. No. 17/217,957, filed Mar. 30, 2021, which is hereby incorporated by reference herein in its entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware.

Virtualized computing environments are frequently supported by block-based storage, object-based storage, database services, and/or other virtual storage services. In some situations, storage resources may be able to interact with various computing virtualizations through a series of standardized storage calls that render the storage resources functionally agnostic to the structural and functional details of the block-based storage volumes that they support and the operating systems executing on the virtualizations to which they provide storage availability.

Some virtualized computing environments may store snapshots, such as point-in-time snapshots of block-based storage volumes. Such snapshots of block-based storage volumes can be used to create a new block-based storage volume that can be attached to a virtual computing instance and mounted to a file system of the virtual computing instance. Once mounted and attached, files included in the block-based storage volume can be accessed via the mounted file system of the virtual computing instance.

Figure 1:
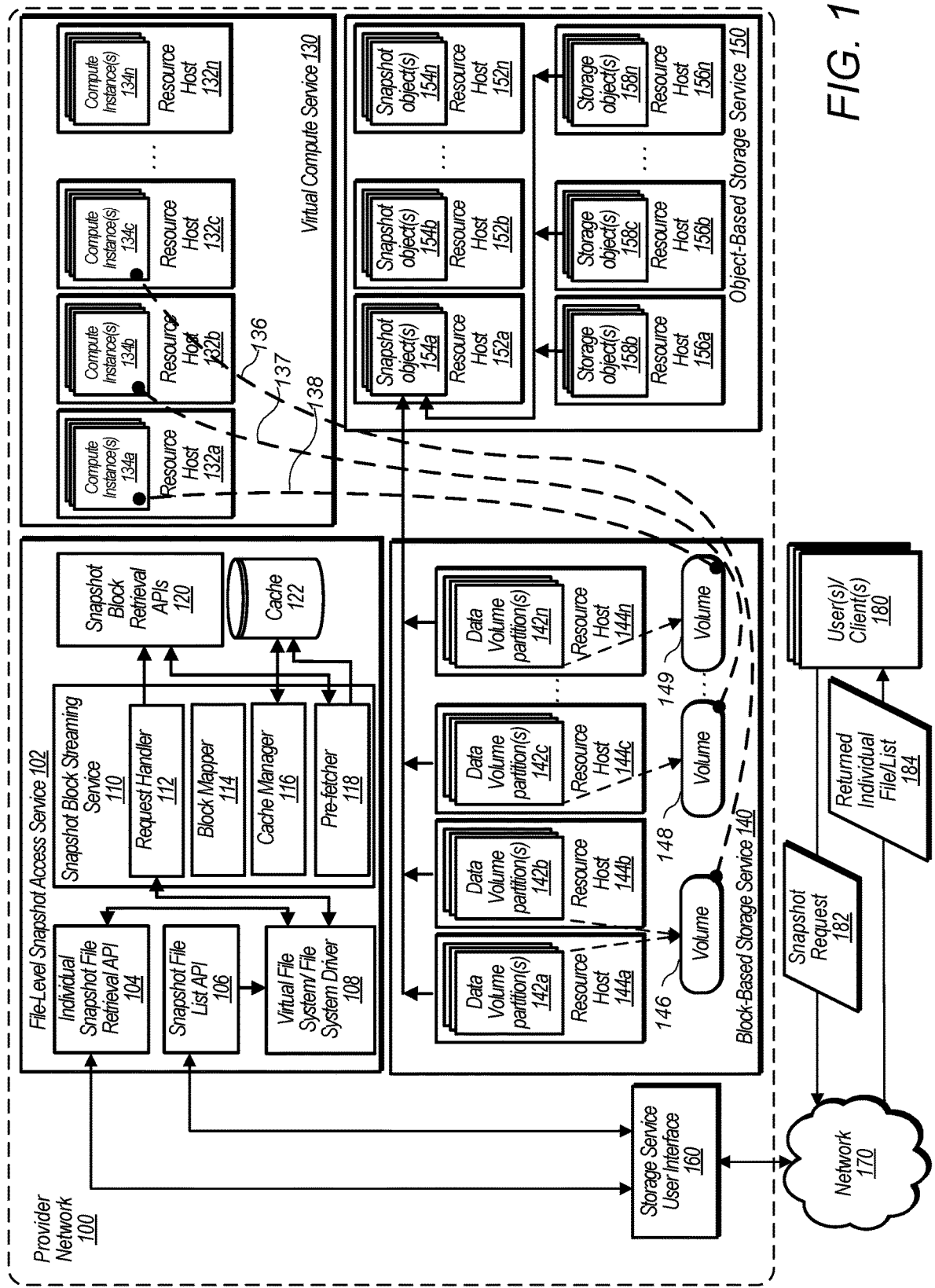
FIG. 1 illustrates a block diagram of a provider network and illustrates a file-level snapshot access service included in the provider network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a file-level snapshot access service configured to provide a "list snapshot files" application programmatic interface (API) and a "get snapshot files" API. The "list snapshot files" API may take as an input a "snapshot_ID" and return a list of files included in the specified snapshot. Also, the "get snapshot files" API may take as inputs (1) "snapshot_ID" and (2) "file_name" and may retrieve the specified file from the specified snapshot.

In contrast to previous methods of retrieving individual files included in a snapshot, the APIs of a file-level snapshot access service may simplify the process by not requiring a snapshot volume to be attached to a computing instance/computing device and also not requiring the snapshot volume to be mounted in a file system of the computing instance/computing device prior to being able to search the volume for a desired file included in the snapshot. For example a user or client desiring a file included in a snapshot may directly request the file by specifying the file name and snapshot ID. Or, if unaware of which files are included in a given snapshot, the user/client may request a list of files included in a given snapshot, and then select a file from the list to directly retrieve a desired file included in a snapshot. This may eliminate the cumbersome process of re-creating a volume from a snapshot, attaching the volume to a computing device/compute instance, mounting the volume in a file system, and then searching the volume for a desired snapshotted file.

In some embodiments, in order to generate a list of files included in a specified snapshot or to retrieve a specified file from a snapshot, a file-level snapshot access service implements a snapshot block streaming service configured to fetch snapshot blocks from a snapshot archive, re-map the snapshot blocks into file-level blocks, and provide the file-level blocks to a virtual file system/file system driver of the file-level snapshot access service. In some embodiments, the file-level snapshot access service implements the file system driver, either using its own supported file system driver or using a virtual file system that uses an operating system kernel (e.g. Linux kernel, Unix kernel, Microsoft Windows kernel, Apple MacOS kernel, Google Chrome OS kernel, etc.) to provide the file system driver for requesting file-level blocks from the block streaming service and for evaluating file-level blocks returned from the block streaming service of the file-level snapshot access service. The file system driver can identify individual files included in the re-mapped blocks and return a list of the individual files or retrieve a specified individual file, based on which API call is received by the file-level snapshot access service.

Distributed systems of a provider network may host various resource instances, such as compute resource instance and storage resource instances, for performing or implementing different systems, services, applications and/or functions. Resource instances may be of many different types and may be hosted at one or more resource hosts of a distributed system, such as one of various types of physical or virtualized computing resources, storage resources, or networking resources.

In some embodiments, the snapshots described herein are point-in-time snapshots generated for block-level storage volumes of a block-based storage service and/or for storage objects stored in an object-based storage service of a distributed system of a provider network. The block-based storage service may provide virtual storage volumes to compute instances of a virtualized computing service of the provider network.

In at least some provider networks, a network-accessible virtual compute service may be established, enabling clients to utilize virtualized compute servers (which may also be referred to as "compute instances" herein) set up on their behalf at resource hosts managed by the provider network operator. A given resource host may implement, at a given point in time, one or more compute instances, as well as a virtualization management software stack (e.g., a hypervisor and/or one or more administrative operating system instances). In some embodiments a virtual compute service may include a set of resource hosts configured to implement compute instances for clients of the virtual compute service. As referred to herein, a set includes a group of one or more constituent components. For example, a set of resource hosts may include a group comprising one resource host, or a group comprising multiple resource hosts.

According to some embodiments, a block-based storage service of the provider network may enable clients to create or instantiate virtual block storage devices, such as mountable block-level storage volumes. The virtual block storage devices may implement block device programmatic interfaces for I/O, and may enable one or more storage volumes to be programmatically attached to a compute instance to support networked block-level I/O operations (as opposed to, for example, file-level I/O operations) from the compute instance. In some embodiments, for example, a block-based storage service may expose a "CreateVolume" application programmatic interface (API), enabling clients to specify a volume size, as well as various other parameters such as a provisioned performance level to be supported by the block-based storage service (expressed in units such as block I/O operations per second) for a requested volume. An "Attach Volume" API may be supported in such an embodiment to programmatically attach a specified volume to a specified compute instance of a virtual compute service. After a given volume implemented by the block-based storage service is attached to a compute instance, in some embodiments, the compute instance may interact with the volume just as it would interact with a local drive, e.g., formatting the volume with a file system and/or installing applications on the volume. Thus, the volumes provided by the block storage service may behave analogously to raw unformatted external hard drives from the perspective of the compute instances. Note that due to such flexibility, in some circumstances different compute instances may format different volumes provided by a block-based storage service with different file systems, for example based on user preferences and objectives.

Clients of a block-based storage service may be able to generate point-in-time snapshots of their volumes programmatically, e.g., using a "CreateSnapshot" API. The point-in-time snapshot may be stored within a different storage service of the provider network in at least some embodiments, such as a storage repository service that exposes a web-services interface rather than a block device interface. In some embodiments, the storage repository service may be an object-based storage service as opposed to a block-based storage service.

For example, in at least some embodiments, the repository storage service may be configured to store key-value objects, e.g. the repository storage service may be an object-based storage service where each object is simply considered as an unstructured collection of bits identified by a key. As opposed to the block device interfaces implemented by the block-based storage service, in at least some embodiments the repository service may implement a web services API, so that, for example, clients of the repository service may store data directly to, and access data directly from, the repository service without being required to attach or mount any devices, and without necessarily using compute instances of the provider network. In various embodiments, the provider network may support high data durability levels, for either the block-based storage service, the storage repository, or both. Various types of data replication techniques, such as full replication or erasure coding algorithms, may be used to ensure the desired data durability in different embodiments. Not that the snapshot objects stored in the storage repository may be referred to herein as a "snapshot archive."

In some embodiments, a block-based storage service providing snapshotting functionality may provide application programmatic interfaces for retrieving full snapshot blocks from a snapshot archive. For example, in some embodiments, a block-based storage service may provide a "list snapshot blocks" API that returns a list of all blocks stored in the snapshot archive for given snapshot (e.g. "snapshot_ID"). Also, the block-based storage service may provide a "Get Snapshot Block" API that returns the contents of a specified block for a specified snapshot, wherein if the block is part of an encrypted snapshot, the API will return the contents in decrypted form. Additionally, a block-based storage service may provide a "List Changed Blocks" API that returns a list of blocks that have changed between successive snapshots in a lineage. These APIs provided by the block-based storage service may be referred to herein as "snapshot block retrieval APIs." In some embodiments, in which a file-level snapshot access service provides file-level access to snapshots for other types of services, such as snapshots generated by an object-based storage service, similar snapshot block retrieval APIs of the other services may be used by a file-level snapshot access service to retrieve the contents of snapshot blocks for snapshots generated by the other types of services.

In some embodiments, a new volume may be created using an existing snapshot as a data source for the volume. For example, a "CreateVolume" call may specify a source snapshot. In some embodiments, a volume populated with data from an existing snapshot may be attached to a desired compute instance, thus setting the state of the compute instance attached to the volume to a point in time at which the snapshot was generated. In some embodiments, a same snapshot may be used to create volumes for a plurality of compute instances. A number of other APIs to manage volumes and snapshots may be supported by a block-based storage service in various embodiments, such as Detach Volume, Delete Volume, Describe Volumes (to obtain configuration information regarding a specified set of volumes), DeleteSnapshot, CopySnapshot, UpdateSnaphsot, and so on. It is noted that in at least in some embodiments, a given snapshot used as a source for a volume may not necessarily represent a single point in time (i.e., not all snapshots need be point-in-time snapshots).

In some embodiments, a provider network includes a plurality of resource hosts configured to implement a block-based storage service, such as storage servers, and one or more resource hosts configured to implement an object-based storage service, such as additional storage devices, storage servers, etc. The object-based storage service is configured to store point-in-time snapshots of blocks of the block-based storage service. Additionally, the provider network includes one or more computing devices configured to implement a file-level snapshot access service. The file-level snapshot access service implements a file-level snapshot access application programmatic interface (API) configured to receive a request to retrieve an individual file included in one or more of the point-in-time snapshots stored in the object-based storage service and also implements a snapshot query API configured to receive a request to list individual files included in snapshot blocks stored in the object-based storage service for a given point-in-time snapshot.

Additionally, the file-level snapshot service implements a file system storage driver (either using its own supported file system drivers or using a virtual file system that uses file system drivers of an OS kernel). The file storage driver is configured issue a request to a request handler of a snapshot block streaming service of the file-level access service, wherein the request calls for a file-level blocks comprising a file specified in a request received at the file level snapshot access API. Alternatively, if a request is received at the snapshot query API that does not specify a particular file, a request may be sent to the request handler of the snapshot block streaming service that requests all file-level blocks for a given snapshot, wherein the request specifies a snapshot for which all file-level blocks are to be retrieved. The request handler in conjunction with a block mapper of the snapshot block streaming service re-maps the request for file-level blocks into a request for snapshot blocks from a snapshot archive, such as the object-based storage service. In order to retrieve the snapshot blocks from the snapshot archive, the snapshot block streaming service issue an API call to a snapshot block retrieval API to retrieve one or more snapshot blocks from the object-based storage service for one or more point in time snapshots. For example, the snapshot block streaming service may issue a request to a snapshot block retrieval API for all snapshot blocks for a given snapshot. If the snapshot block streaming service may also issue a request to a snapshot block retrieval API to list snapshot blocks included in a given snapshot, or return all snapshot blocks for a given snapshot.

As discussed above, the snapshot block streaming service of the file-level snapshot access service includes a block mapper that re-maps requests for file system level blocks into a request for snapshot blocks, and that also re-maps retrieved snapshot blocks into file system-level blocks. For example, in some embodiments, snapshot blocks may have a different size (e.g. include more bytes) than a file-system level block. Thus, it may be necessary to re-map the retrieved snapshot blocks into file-system level blocks. As an example, file system data storage blocks may be 4 KB blocks, whereas snapshot blocks may be 500 KB blocks. Thus, the snapshot blocks must be re-mapped in order for the file system driver to be able to access the correct pieces of data by issuing a call to a particular offset of a particular file system-level block (that has been re-mapped).

Also, in some embodiments, a snapshot block streaming service of a file-level snapshot access service may include a pre-fetcher that anticipates snapshot blocks that are likely to be requested and pre-fetches the snapshot blocks using the snapshot block retrieval APIs of the block-storage service and/or other services supporting snapshotting. Additionally, in some embodiments, a snapshot block streaming service of a file-level snapshot access service may include a cache manager that evicts snapshot blocks from a cache of the snapshot block streaming service, based on a variety of factors, such as time since last use, likelihood that the snapshot block will be requested within a threshold amount of time, a use history of the file-level snapshot access service, whether or not the cached snapshot blocks pertain to a current user or account accessing the file-level snapshot access service, etc.

The file system driver implemented by, or for, the file-level snapshot access service identifies one or more instances of the individual file specified in the API call that are included in re-mapped file-system level blocks that have been re-mapped from the one or more snapshot blocks stored in the cache (in response to an API call to the file-level snapshot access API) or determines a list of files included in re-mapped file-system level blocks that have been re-mapped from one or more snapshot blocks for a specified snapshot (in response to an API call to the snapshot query API) and returns a response to the request, the response comprising the one or more instances of the individual file included in the one or more snapshot blocks or a list of individual files included in the given point-in-time snapshot.

In some embodiments, a storage service user interface may be provided for a storage service, such as a block-based storage service or an object-based storage service supporting snapshotting, wherein the storage service user interface is configured to receive a request specifying a time range for point-in-time snapshots and a specification of one or more individual files to be queried for in the specified time range. In such embodiments, the storage service user interface may determine one or more point-in-time snapshots within the specified time range and issue one or more API calls to a file-level snapshot access API of a file-level snapshot access service, wherein the one or more API calls each specify a given one of the one or more individual files to be queried for and a given one of the one or more determined point-in-time snapshots for which the given file is to be retrieved. In some embodiments, instead of retrieving all the instances of the given file within the specified date range, the user interface of the storage service may return a list of instances of the specified file included in snapshots falling within the specified date range, and may provide a user an option to select a given one of the instances of the specified file to be retrieved from a given one of the snapshots falling within the specified date range. In response to such a selection, the user interface may issue a "get file" API call to the file-level snapshot access service, wherein the "get file" API call specifies the file to be retrieved and the selected snapshot (e.g. snapshot ID) from which the given file is to be retrieved.

In some embodiments, a file-level snapshot access service may store lists of files included in snapshot blocks of previously fetched snapshots in a database, such that it is not necessary to retrieve all snapshot blocks for a given snapshot in order to answer API calls, such as a "get file list" API call.

In some embodiments, a pre-fetcher of the file-level snapshot access service may anticipate snapshot blocks likely needed to respond to future API calls to be received by the snapshot access service and may pre-fetch snapshot blocks from a snapshot archive. For example, the pre-fetcher may pre-fetch snapshot blocks based on a block-based storage service account of a user accessing the file-level snapshot access service, a snapshot retrieval history of a user accessing the file-level snapshot access service, an event occurring in account associated with a user accessing the file-level snapshot access service, or other similar heuristics that may be used to anticipate snapshot blocks likely to be needed to respond to future API calls.

In some embodiments, a user/client issuing an API call to the file-level snapshot access service may be an application executing within the service provider network, for example an application executing on a virtualized compute instance of a virtualized compute service of the service provider network. Also, in some embodiments, the user/client issuing the API call may be a user of the block-based storage service interacting with a console via a network connection to the provider network. In some embodiments, a retrieved file, retrieved from a specified snapshot, may be returned to a virtualized computing instance of the virtualized computing service of the provider network, or may be returned to a computing device outside of a provider network, via a network connection. For example, the retrieved file may be returned to an off-premises computing device of a customer of the object-based storage service.

In some embodiments, snapshot blocks that are re-mapped to file-system level blocks may appear as virtual hard disks, and the file-level snapshot access service (or a kernel of an OS implemented in a virtual file system for the file-level access service) may use file system interpretation primitives to directly access files from the re-mapped snapshot blocks (e.g. re-mapped to file-system level blocks). Thus, the file-level snapshot access service may provide fine-grained access to individual files (as opposed to access to whole volumes).

In some embodiments, clients of a file-level snapshot access service (or other services of a service provider network) may build applications using the APIs of the file-level snapshot access service. For example, API calls may be programmatically generated, wherein responses are programmatically provided back to the applications for further processing.

In some embodiments, a file-level snapshot access service is implemented in a user space from the perspective of the block-based storage and/or object based storage service. For example, the components of the file-level snapshot access service are implemented outside of the block-based storage and/or object based storage service and interact with the block-based storage and/or object based storage service via snapshot block retrieval APIs of the block-based storage and/or object based storage service.

FIG. 1 illustrates a block diagram of a provider network that includes a file-level snapshot access service, according to some embodiments.

Provider network 100 may be set up by an entity such as a company or a public sector organization to provide one or more services (such as various types of cloud-based computing or storage) accessible via the Internet and/or other networks to users/clients 180. Provider network 100 may include numerous data centers hosting various pools of resource hosts, such as collections of physical and/or virtualized computer servers, storage devices, networking equipment and the like (e.g., computing system 1400 described below with regard to FIG. 14), needed to implement and distribute the infrastructure and services offered by the provider network 100. In some embodiments, provider network 100 may provide computing resources, such as virtual compute service 130, storage services, such as block-based storage service 140 and object-based storage service 150 (which may include various storage types such as object/key-value based data stores or various types of database systems), and/or any other type of network-based services. Users/clients 180 may access these various services offered by provider network 100 via network 170. Likewise network-based services may themselves communicate and/or make use of one another to provide different services. For example, computing resources offered to clients 180 in units called "instances," such as virtual or physical compute instances or storage instances, may make use of other resources, such as data volumes 146, 148 through 149, providing virtual block storage for the compute instances 134a, 134b, and 134c via virtual attachments 136, 137, and 138.

As noted above, virtual compute service 130 may offer various compute instances to users/clients 180. A virtual compute instance may, for example, be implemented on one or more resource hosts 132 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 130 in different embodiments, including special purpose computer servers, storage devices, network devices and the like. In some embodiments instance clients 180 or any other users may be configured (and/or authorized) to direct network traffic to a compute instance. In various embodiments, compute instances may attach or map to one or more data volumes, such as data volumes 146, 148, and 149, provided by block-based storage service 140 in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 180 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 100 may also implement block-based storage service 140 for providing storage resources and performing storage operations. Block-based storage service 140 is a storage system, composed of a pool of multiple independent resource hosts 144*a*, 144*b*, 144*c* through 144*n* (e.g., server block data storage systems), which provide block level storage for storing one or more sets of data volumes, such as data volume partition(s) 142*a*, 142*b*, 142*c* through 142*n*. Data volumes 146, 148, and 149 (comprising data volume partitions 142*a*-142*n*) may be mapped to particular clients, providing virtual block-based storage (e.g., hard disk storage or other persistent storage) as a contiguous set of logical blocks. In some embodiments, a data volume 146, 148, or 149 may be divided up into multiple data chunks (including one or more data blocks) for performing other block storage operations, such as snapshot operations or replication operations. A volume snapshot of a data volume 146, 148, or 149 may be a fixed point-in-time representation of the state of the data volume 146, 148, or 149. In some embodiments, volume snapshots may be stored remotely from a resource host 144 maintaining a data volume, such as in another storage service, such as object-based storage service 150. Snapshot operations may be performed to send, copy, and/or otherwise preserve the snapshot of a given data volume in another storage location, such as a remote snapshot data store in other storage service, such as object-based storage service 150.

In some embodiments, an object-based storage service, such as object-based storage service 150, may include a plurality of resource hosts that store snapshot objects and/or other storage object. As referred to herein the snapshot objects and resource hosts storing the snapshot objects may form a snapshot archive. For example, object-based storage service 150 includes resource hosts 152*a* and 152*b* through 152*n* storing snapshot objects 154*a* and 154*b* through 154*n*. Additionally, object-based storage service 150 includes resource hosts 156*a* and 156*b* through 156*n* storing storage objects 158*a* and 158*b* through 158*n*. For ease of illustration, snapshot objects 154 and storage objects 158 are illustrated as being stored on different resource hosts of object-based storage service 150. However, in some embodiments a same resource host of an object-based storage service, such as a resource host 152 of object-based storage service 150 may store both storage objects and snapshot objects, for example from a snapshot taken of a volume stored in block-based storage service 140 or from a machine image used by a target volume of a block-based storage service to boot a compute instance, such as one of compute instances 134.

In some embodiments, volume snapshots of various data volumes 146, 148, 149, etc. may be stored as snapshot objects for a particular data volume. In addition to object-based storage service 150, provider network 100 may implement other network-based services, which may include various different types of analytical, computational, storage, or other network-based system allowing users/clients 180, as well as other services of provider network 100 (e.g., block-based storage service 140, virtual compute service 130 and/or object-based storage service 150) to perform or request various tasks.

Users/clients 180 may encompass any type of client configurable to submit requests to network provider 100. For example, a given client 190 may include a suitable version of a web browser, or may include a plug-in module or other type of code module configured to execute as an extension to or within an execution environment provided by a web browser. Alternatively, a client 180 may encompass an application such as a database application (or user interface thereof), a media application, an office application or any other application that may make use of compute instances 134, a data volume 146, 148, 149, etc. or other network-based service in provider network 100 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 180 may be configured to generate network-based services requests according to a Representational State Transfer (REST)-style network-based services architecture, a document- or message-based network-based services architecture, or another suitable network-based services architecture. In some embodiments, a client 180 (e.g., a computational client) may be configured to provide access to a compute instance 134 or data volume 120 in a manner that is transparent to applications implemented on the client 180 utilizing computational resources provided by the compute instance 134 or block storage provided by the data volume 146, 148, 149, etc.

Clients 180 may convey network-based services requests to provider network 100 via external network 170. In various embodiments, external network 170 may encompass any suitable combination of networking hardware and protocols necessary to establish network-based communications between clients 180 and provider network 100. For example, a network 170 may generally encompass the various telecommunications networks and service providers that collectively implement the Internet. A network 170 may also include private networks such as local area networks (LANs) or wide area networks (WANs) as well as public or private wireless networks. For example, both a given client 180 and provider network 100 may be respectively provisioned within enterprises having their own internal networks. In such an embodiment, a network 174 may include the hardware (e.g., modems, routers, switches, load balancers, proxy servers, etc.) and software (e.g., protocol stacks, accounting software, firewall/security software, etc.) necessary to establish a networking link between given client 180 and the Internet as well as between the Internet and provider network 100. It is noted that in some embodiments, clients 180 may communicate with provider network 100 using a private network rather than the public Internet.

Provider network 100 also includes file-level snapshot access service 102. In some embodiments, a file-level snapshot access service, such as file-level snapshot access service 102, includes an individual snapshot file retrieval API 104 (e.g. "get file API") and a snapshot file list API 106 (e.g. "get file list API"). The individual snapshot file retrieval API 104 may take as an input a request formatted in accordance with the API specifying a "snapshot_ID" and a "filename" and may return a file having the specified file name included in the specified snapshot. The snapshot file list API 106 may take as an input a request formatted in accordance with the API specifying a "snapshot_ID" and may return a list of all files included in the specified snapshot.

Also, the file-level snapshot access service 102 includes a snapshot block streaming service 110 configured to stream snapshot blocks from a snapshot archive, such as implemented via the snapshot objects 154 stored in resource hosts 152 of object-based storage service 150. For example, the snapshot block streaming service 110 may issue API calls to snapshot block retrieval APIs 120 to request a list of snapshot blocks for a given snapshot (e.g. "Snapshot_ID") or a request to retrieve a particular snapshot block, wherein the request specifies a "Snapshot_ID" and a "Block_ID" for a snapshot block of a given snapshot and returns the requested snapshot block. Also, the snapshot block retrieval APIs may support a "List changed blocks" API call which returns a list of blocks that have changed between successive point-in-time snapshots.

In some embodiments, the snapshot block streaming service 110 includes a request handler that issues API calls to the snapshot block retrieval APIs based on API calls received at APIs 104 and 106, and/or based on determinations made by pre-fetcher 118 to pre-fetch one or more snapshot blocks. For example, pre-fetcher 118 may anticipate snapshot blocks likely needed to respond to future API calls to be received by the snapshot access service and may pre-fetch snapshot blocks from a snapshot archive. For example, the pre-fetcher may pre-fetch snapshot blocks based on a block-based storage service account of a user accessing the file-level snapshot access service, a snapshot retrieval history of a user accessing the file-level snapshot access service, an event occurring in account associated with a user accessing the file-level snapshot access service, or other similar heuristics that may be used to anticipate snapshot blocks likely to be needed to respond to future API calls.

In some embodiments, the snapshot block streaming service 110 includes a block-mapper that re-maps snapshot blocks to file system-level blocks (which may also be referred to herein as "data storage blocks"). For example, in some embodiments, snapshot blocks may have a different size (e.g. include more bytes) than a file-system level block. Thus, it may be necessary to re-map the retrieved snapshot blocks into file system-level blocks. As an example, file system data storage blocks may be 4 KB blocks, whereas snapshot blocks may be 500 KB blocks. Thus, the snapshot blocks must be re-mapped in order for the file system driver to be able to access the correct pieces of data by issuing a call to a particular offset of a particular file system-level block (that has been re-mapped).

In some embodiments, the snapshot block streaming service 110 includes a cache manager 116 that evicts snapshot blocks from a cache 122 of the file-level snapshot access service 102, based on a variety of factors, such as time since last use, likelihood that the snapshot block will be requested within a threshold amount of time, a use history of the file-level snapshot access service, whether or not the cached snapshot blocks pertain to a current user or account accessing the file-level snapshot access service, etc.

In some embodiments, file-level snapshot access service 102 includes virtual file system/file system driver 108 that is implemented, either using the file-level snapshot access service's own supported file system driver or using a virtual file system that uses an operating system kernel (e.g. Linux kernel, Unix kernel, Microsoft Windows kernel, Apple MacOS kernel, Google Chrome OS kernel, etc.) to provide a file system driver for accessing the cached re-mapped storage blocks. The file system driver can identify individual files included in the re-mapped blocks and return a list of the individual files or retrieve a specified individual file, based on which API call is received by the file-level snapshot access service.

In some embodiments, file storage driver is configured issue a request to request handler 112 of snapshot block streaming service 110 of the file-level access service 102, wherein the request calls for a data block comprising a file specified in a request received at the individual file snapshot retrieval API 104. Alternatively, if a request is received at the snapshot file list API 106 that does not specify a particular file, a request may be sent to the request handler 112 of the snapshot block streaming service 110 without using the virtual file system/file system driver 108, wherein the request specifies a snapshot for which all snapshot blocks are to be retrieved from a snapshot archive, such as the snapshot objects 154 stored in object-based storage service 150. In response to receiving a request for snapshot blocks, the snapshot block streaming service retrieves, via snapshot block retrieval APIs 120, one or more snapshot blocks from the object-based storage service 150 for one or more point in time snapshots. For example, if the API call specifies a particular file, the snapshot block streaming service may issue a request to a snapshot block retrieval API 120 for a snapshot block comprising the particular file. If the snapshot block streaming service 110 is not aware as to which snapshot blocks of a given snapshot includes the particular file, the snapshot block streaming service 110 may issue a request to a snapshot block retrieval API 120 to list snapshot blocks included in a given snapshot, or return all snapshot blocks for a given snapshot.

In some embodiments, a client, such as user/client 180, may submit a snapshot request 182 to a storage service user interface 160 via network 170 and may receive back returned individual files and/or a list of files included in a snapshot (184). While not shown in FIG. 1, in some embodiments, clients 180 may be implemented on compute instances 134 and may issue API calls to APIs 104 and 106 directly within the provider network without routing requests through network 170. Moreover, APIs 104 and 106 may return retrieved files to storage objects 158, such as a storage bucket, of object-based storage service 150. From there, a compute instance 124 may access the individual requested file from the specified snapshot.

In some embodiments, a storage service user interface 160 may be configured to receive a request specifying a time range for point-in-time snapshots and a specification of one or more individual files to be queried for in the specified time range. In such embodiments, the storage service user interface 160 may determine one or more point-in-time snapshots within the specified time range and issue one or more API calls to API 104, wherein the one or more API calls each specify a given one of the one or more individual files to be queried for and a given one of the one or more determined point-in-time snapshots for which the given file is to be retrieved. In some embodiments, instead of retrieving all the instances of the given file within the specified date range, the user interface 160 may return a list of instances of the specified file included in snapshots falling within the specified date range, and may provide a user an option to select a given one of the instances of the specified file to be retrieved from a given one of the snapshots falling within the specified date range. In response to such a selection, the user interface 160 may issue a "get file" API call to the API 104, wherein the "get file" API call specifies the file to be retrieved and the selected snapshot (e.g. snapshot ID) from which the given file is to be retrieved.

Figure 2:
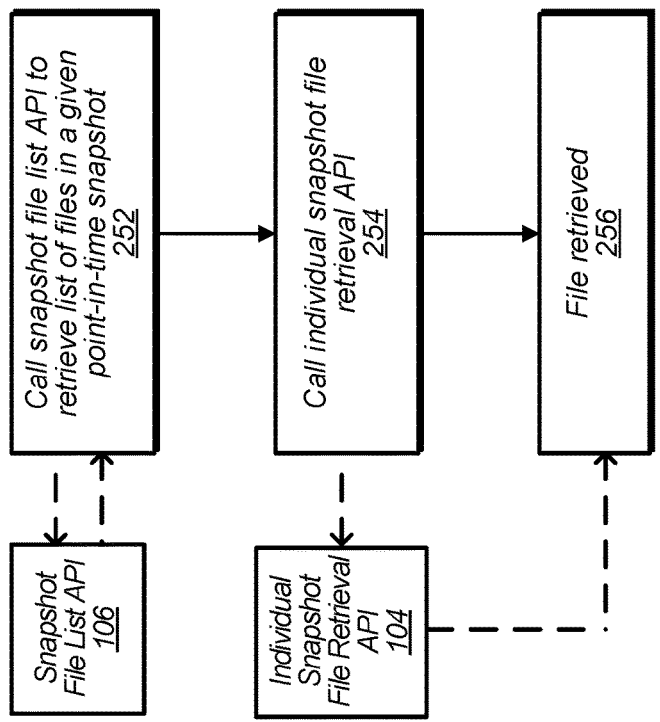
FIG. 2 illustrates a comparison of processes for retrieving individual files from a snapshot with and without using a file-level snapshot access service, according to some embodiments.
Figure 2:
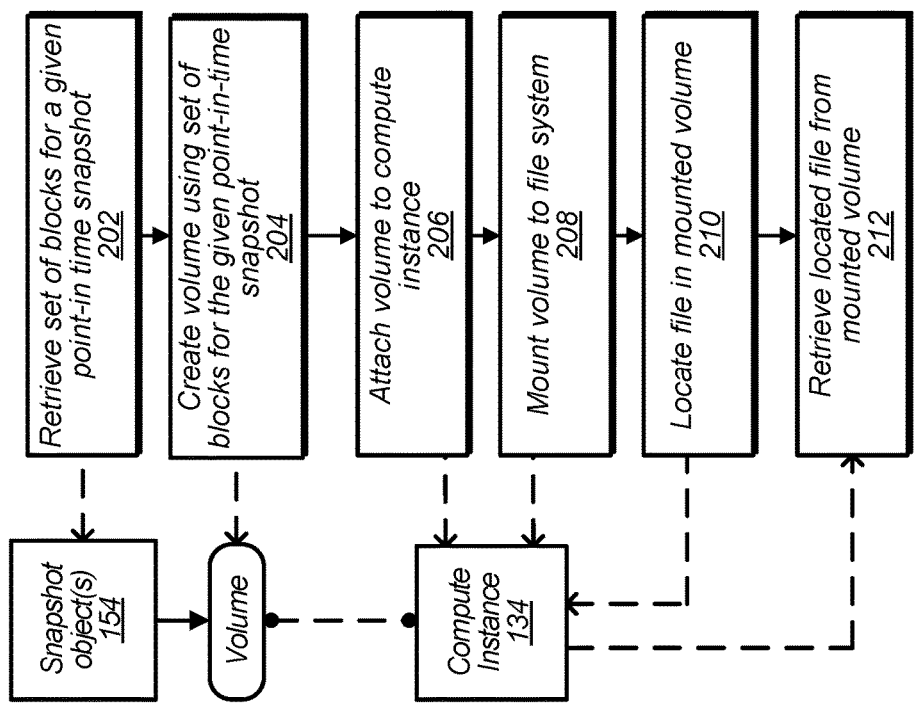

FIG. 2 illustrates a comparison of processes for retrieving individual files from a snapshot with and without using a file-level snapshot access service, according to some embodiments.

In order to retrieve a particular individual file included in a snapshot, without using a file-level snapshot access service as described herein, the steps shown in 202-212 may be performed. For example, it may be necessary to retrieve a set of snapshot blocks for a given specified point-in-time snapshot (202), create a volume using the snapshot blocks (204), attach the created volume to a compute instance (206), mount the attached volume in a file system (208), locate the desired file in the mounted volume (210), and retrieve the located file (212).

In comparison, a file-level snapshot access service may significantly simplify the process of accessing an individual file included in a given snapshot. For example, at block 252 a client may issue an API call to an API of a file-level snapshot access service to receive a list of files included in a given specified point-in-time snapshot. Then, at block 254, the client may issue an additional API call to the file-level snapshot access service specifying a snapshot and further specifying a file to be retrieved that is included in the specified snapshot. In response, at block 256 the client receives the specified file included in the specified snapshot.

Figure 3:
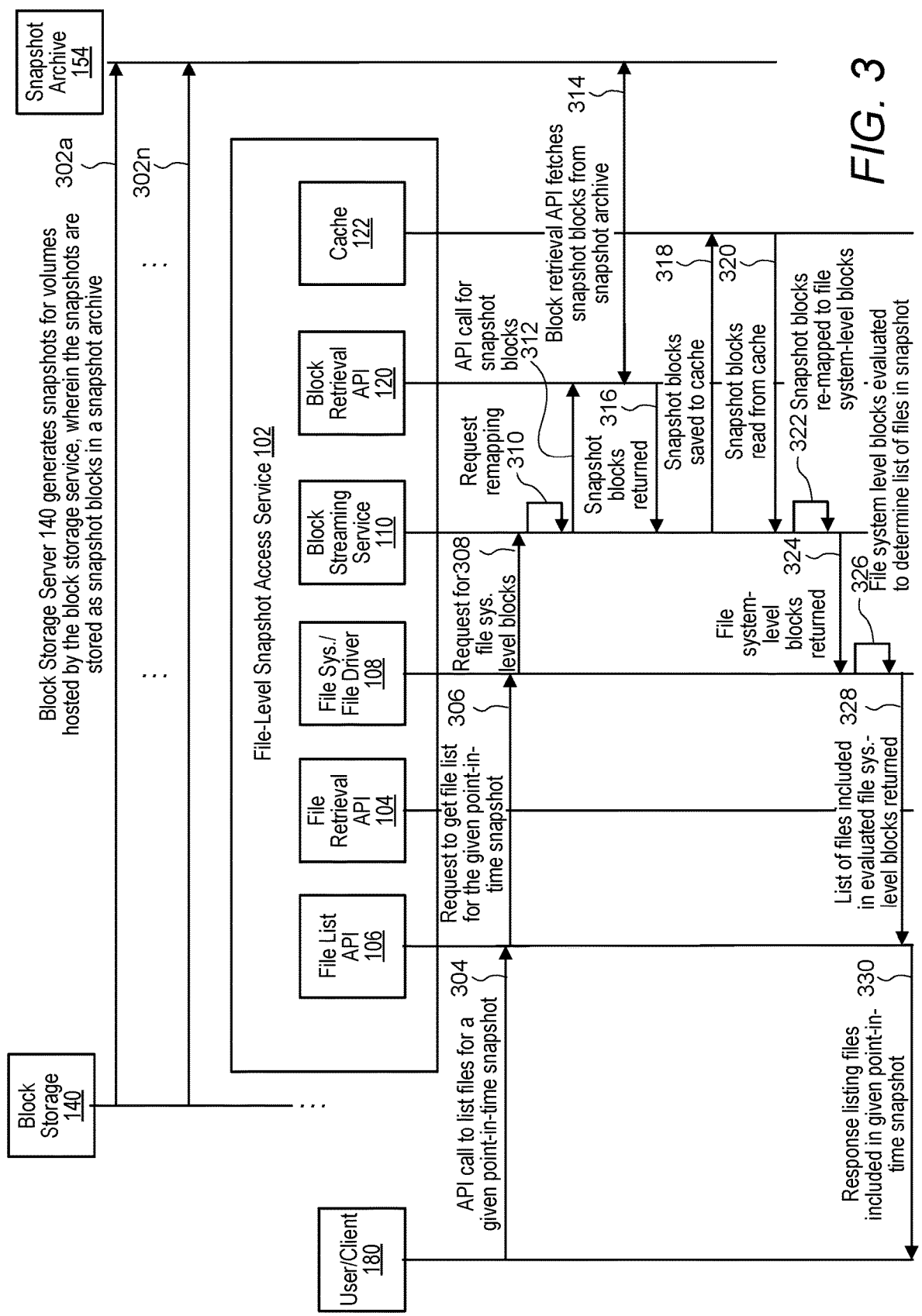
FIG. 3 illustrates a diagram showing steps for processing an API call to list files included in a given snapshot by a file-level snapshot access service, according to some embodiments.

FIG. 3 illustrates a diagram showing steps for processing an API call to list files included in a given snapshot by a file-level snapshot access service, according to some embodiments.

At 302a through 302n, block storage 140 generates snapshots for volumes hosted by the block storage service, wherein the snapshots are stored as snapshot blocks in a snapshot archive.

At 304, a user/client 180 issues an API call to list files include in a given point-in-time snapshot to a file list API 106 of a file-level snapshot access service 102. In response, at 306 a request is sent to a virtual file system/file system driver 108 of the file-level snapshot access service 102. The virtual file system/file driver 108 issues a request (308) to the block streaming service 110 for file system level blocks for the given specified point-in-time snapshot. In response to receiving the request 308, block streaming service 110 re-maps (310) the file system-level blocks into snapshot blocks and determines whether or not the snapshot blocks for the specified point in time snapshot are already stored in cache 122. If the snapshot blocks are not included in the cache, at 312 the block streaming service 110 issues an API call for the snapshot blocks to the block retrieval APIs 120. Then, at 314 the block retrieval APIs 120 retrieve the requested snapshot blocks from the snapshot archive 154 and at 316 return the requested snapshot blocks to the block streaming service 110. At 318, the block streaming service 110 saves the snapshot blocks to cache 122.

At 320, the block-streaming service 110 reads snapshot blocks from cache 122 pertaining to the snapshot that is the subject of the API call to list files (request 304) and at 322 re-maps the relevant snapshot blocks into file system-level blocks. At 324, the file system-level blocks are returned to the virtual file system/file driver 108.

At 326, the virtual file system/file driver 108 evaluates the data storage blocks (e.g. file-system level blocks re-mapped from snapshot blocks) for the specified snapshot (e.g. the re-mapped snapshot blocks) to determine a list of files included in the snapshot. At 328, virtual file system/file driver 108 returns the list of files to the file list API 106, and at 330 the file list API 106 returns a list of files included in the specified snapshot to user/client 180.

Figure 4:
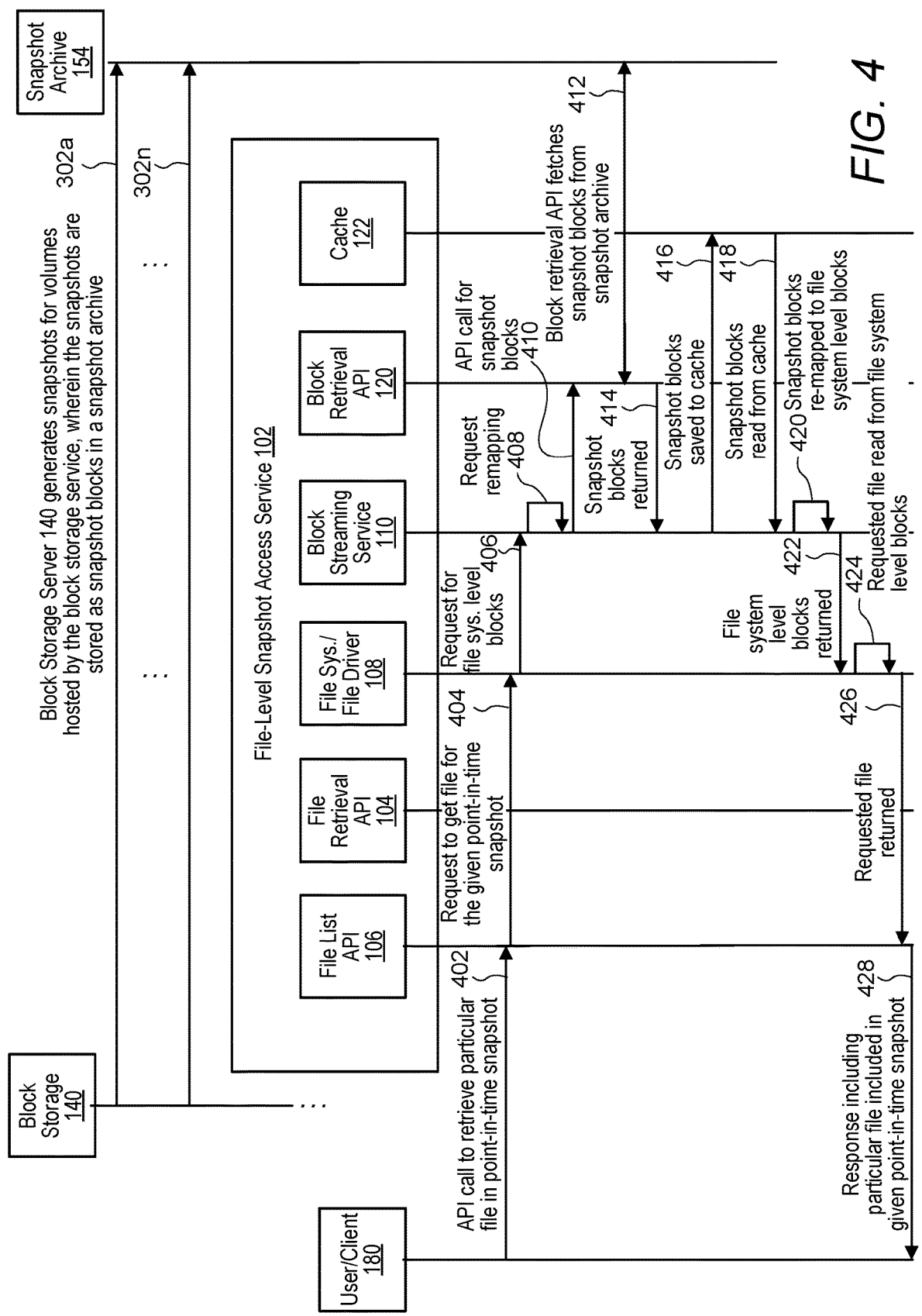
FIG. 4 illustrates a diagram showing steps for processing an API call to retrieve a particular file included in a given snapshot by a file-level snapshot access service, according to some embodiments.

FIG. 4 illustrates a diagram showing steps for processing an API call to retrieve a particular file included in a given snapshot by a file-level snapshot access service, according to some embodiments.

At 402, the user/client 180 issues an API call to file retrieval API 104 specifying a particular file included in a specified snapshot that is to be retrieved. In response, a request (404) to get the file included in the specified point-in-time snapshot is issued to the virtual file system/file driver 108. At 406, the virtual file system/file driver 108 issues a request to get file system-level blocks for the specified snapshot that includes the specified file. The issued request is sent to block streaming service 110. The block streaming service 110 re-maps (408) the file-system level blocks into snapshot blocks and determines if the snapshot blocks for the specified snapshot that include the specified file are already stored in the cache 122. If not, at 410, the block streaming service 110 issues an API call to block retrieval API 120 for the snapshot blocks for the specified snapshot. At 412, the block retrieval API 120 retrieves the snapshot blocks for the specified snapshot from snapshot archive 154 and provides the retrieved snapshot blocks to block streaming service 110 (414). At 416, the block streaming service 110 stores the snapshot blocks in the cache 122.

At 418, the block streaming service 110 reads the snapshot blocks from the cache and at 420 re-maps the snapshot blocks into file-system level blocks. At 422 the block streaming service 410 provides the re-mapped blocks (e.g.

snapshot blocks that have been re-mapped to file system level blocks to the virtual file system/file driver 108.

At 424, the virtual file system/file driver 108 evaluates the re-mapped snapshot blocks (e.g. the data storage blocks) to locate and retrieve the specified file. At 426, the virtual file system/file driver returns the request file in the specified snapshot to the file list API 106 and at 428 the file-level snapshot access service 102 returns the requested particular file specified in the request 402 to user/client 180.

Figure 5:
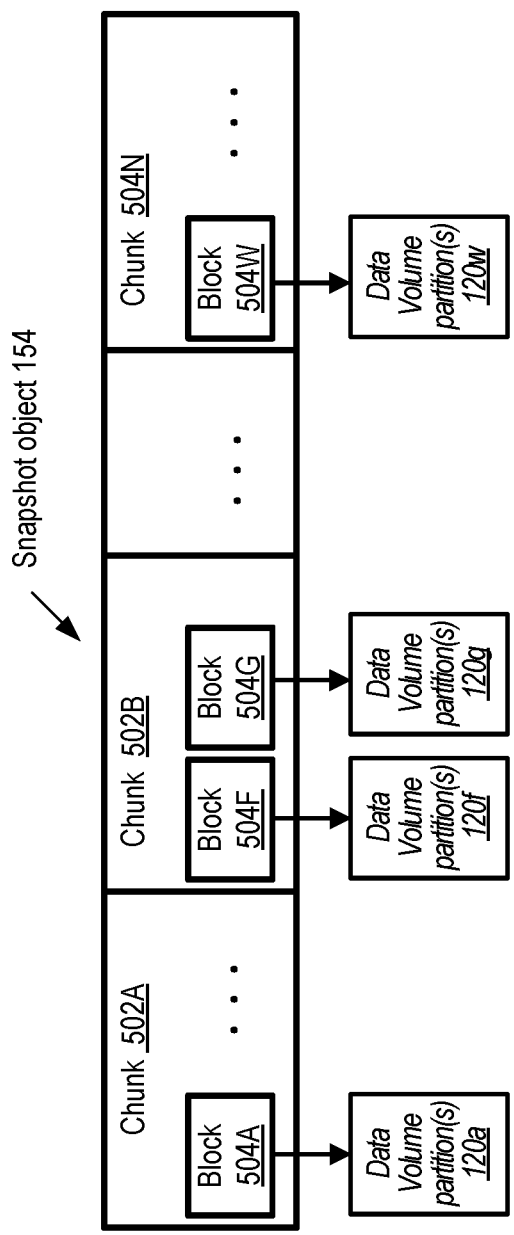
FIG. 5 illustrates chunks and blocks of a snapshot object, according to some embodiments.

FIG. 5 illustrates chunks and blocks of a snapshot object, according to some embodiments.

In at least some embodiments, the units of data transfers to and from a storage repository service, such as any of the object-based storage services described above, may differ from the units (e.g. the block size) in which data is read and written by the compute server instances. For example, in one implementation, data transfers to/from a repository service may be performed in multiples of four-megabytes, while the block size used for accessing volume contents may be four kilobytes or even 512 bytes. Data may be transferred in larger units than typical block sizes to reduce networking overhead, for example. The units of data transfer to and from the repository service may be referred to as "chunks" herein.

As shown, a snapshot object 554 may comprise a plurality of chunks 560, such as chunks 560A, 560B . . . 560N, each of which may in at least some implementations comprise a plurality of data blocks. Thus, in the depicted example, chunk 560A includes at least block 562A, chunk 560B includes blocks 562F and 562G, and chunk 560N includes block 560N.

Figure 6:
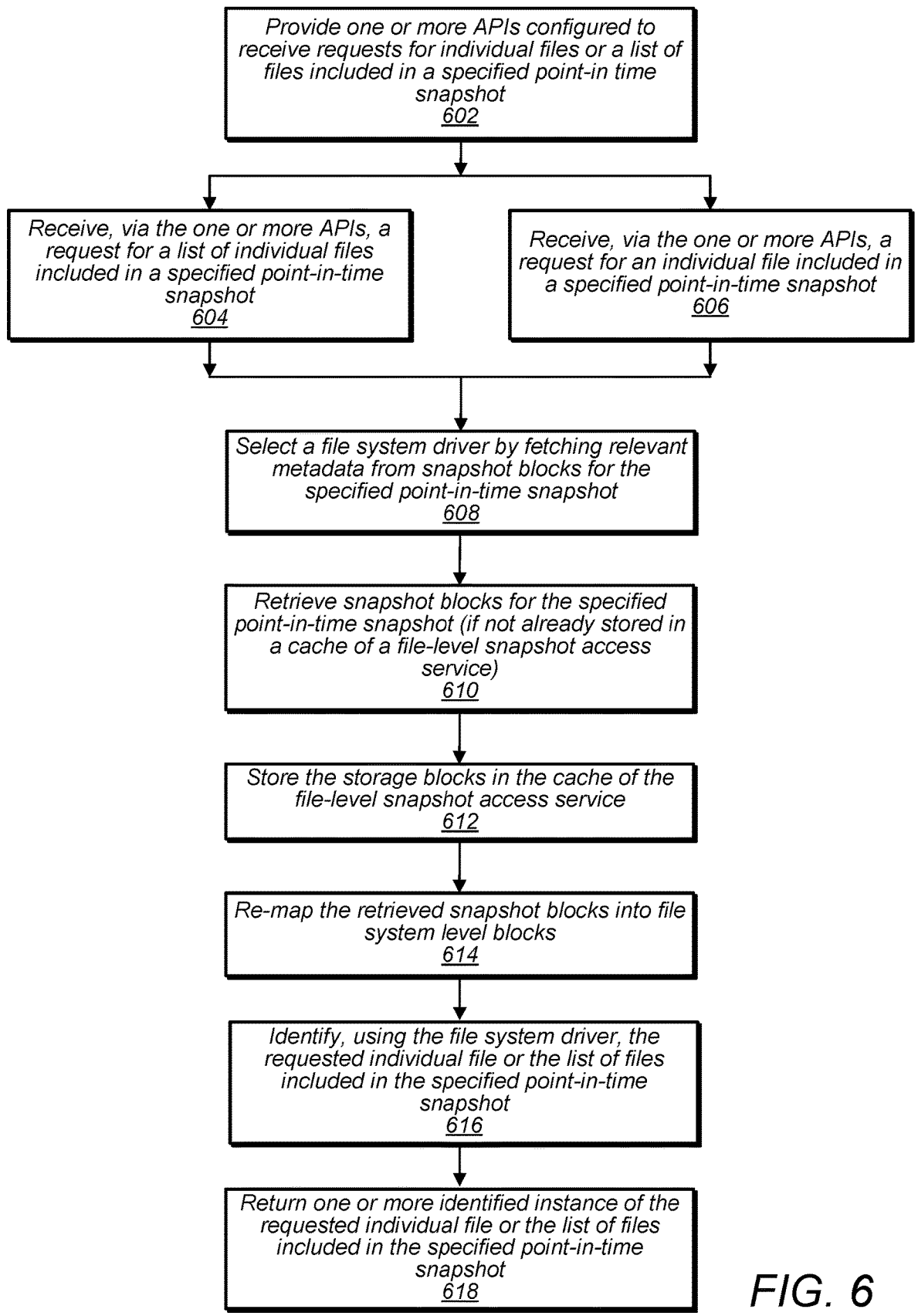
FIG. 6 is a high-level flowchart illustrating various methods and techniques for accessing individual files included in a given snapshot performed by a file-level snapshot access service, according to some embodiments.

FIG. 6 is a high-level flowchart illustrating various methods and techniques for accessing individual files included in a given snapshot performed by a file-level snapshot access service, according to some embodiments.

At 602, a file-level snapshot access service provides one or more APIs configured to receive requests for individual files or a list of files included in a specified point-in time snapshot. At 604, the file-level snapshot access service receives, via an API of the file-level access service a request for a list of individual files included in a specified point-in-time snapshot, or at 606, the file-level snapshot access service receives, via an API of the file-level access service a request for an individual file included in a specified point-in-time snapshot.

At 608, a virtual file system kernel or a file system selection algorithm of the file-level snapshot access service selects a file system type and a corresponding file system driver for the specified point-in-time snapshot that is to be read to retrieve the requested individual file. Each file system type has a corresponding, specific file system driver. The file system type selection may be an iterative process, wherein different file system drivers are attempted to determine/select the file system type to use to read the snapshot block(s). For example, file system drivers, such as ext4, xfs, ntfs, etc. may be attempted. Also as an example of the iterative process, the file system type may be detected by fetching relevant metadata blocks from the specified point-in-time snapshot. So, for the supported file system types (e.g. ext4, xfs, ntfs, etc), a first attempt may try to fetch a few metadata blocks from the snapshot based on a first one of the supported file system types. If the attempt to fetch and interpret the metadata correctly using the first supported file system type is successful such that the first supported file system type matches the file system type of the metadata in the snapshot, then the first supported file system type is determined as the file system type of the snapshot. If not, the process is repeated for other ones of the supported file system types until a match is found. If no match is found, then a message may be returned indicating the snapshot uses an unsupported file system type.

At 610, the selected file system driver interacts with a block streaming service to retrieve snapshot blocks for the specified point-in-time snapshot (if not already stored in a cache of a file-level snapshot access service). At 612, the file-level access service stores the snapshot blocks in a cache of the file-level access service. At 614, the block streaming service re-maps snapshot blocks to be read by the selected file system driver from snapshot sized blocks to file system-level blocks. At 616, a file system driver identifies the requested file or a list files included in the re-mapped data storage blocks (e.g. snapshot blocks re-mapped to file system-level blocks). Where the data storage objects are re-mapped snapshot blocks of the specified point-in-time snapshot that is to be queried for a list of files, or from which a specified file is to be retrieved. At 618, the file-level access service returns one or more identified instance of the requested individual file or the list of files included in the specified point-in-time snapshot.

Figure 7:
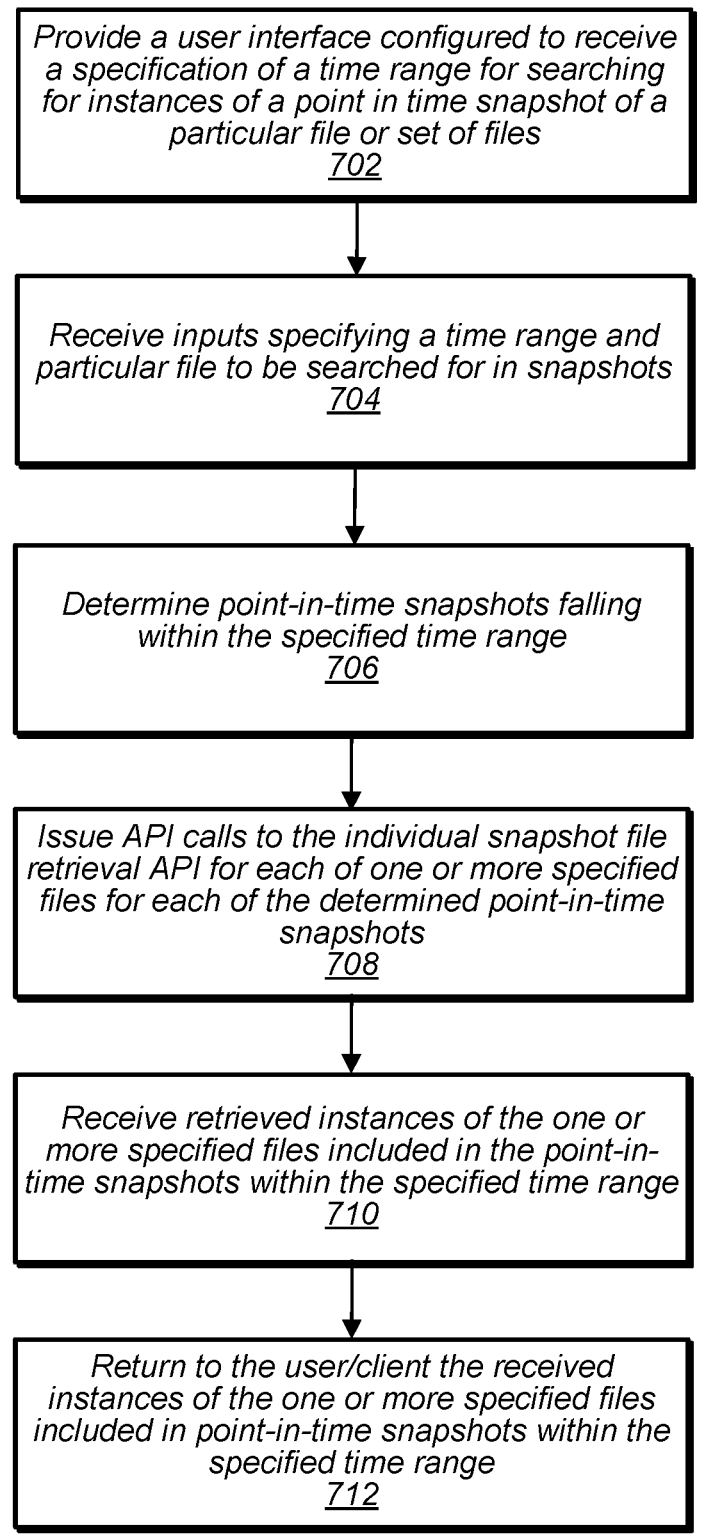
FIG. 7 is a high-level flowchart illustrating various methods and techniques for providing a user interface to a storage surface that interacts with a file-level snapshot access service, according to some embodiments.

FIG. 7 is a high-level flowchart illustrating various methods and techniques for providing a user interface to a storage surface that interacts with a file-level snapshot access service, according to some embodiments.

At 702, a user interface for a storage service or for the file-level access service provides a user interface configured to receive a specification of a time range for searching for instances of a point in time snapshot of a particular file or set of files. At 704, the user interface receives inputs specifying a time range and particular file to be searched for in snapshots. At 706, the user interface determines point-in-time snapshots falling within the specified time range. Then, at 708, the user interface issues API calls to the individual snapshot file retrieval API (e.g. API 104) for each of one or more specified files for each of the determined point-in-time snapshots. At 710, the user interface receives retrieved instances of the one or more specified files included in the point-in-time snapshots within the specified time range. Finally, at 712, the user interface returns to the user/client the received instances of the one or more specified files included in point-in-time snapshots within the specified time range.

Figure 8A:
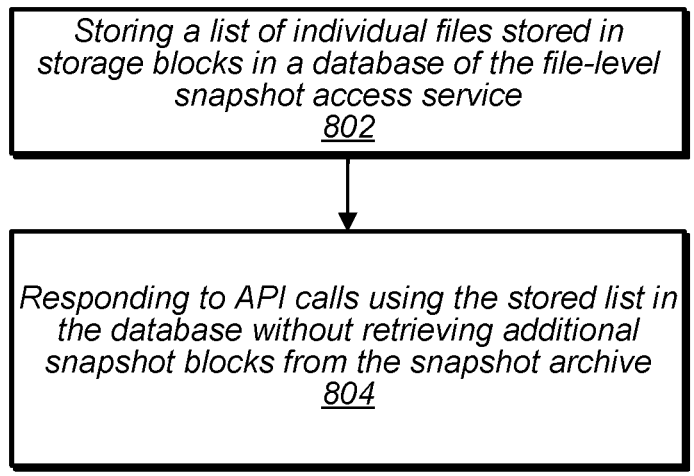
FIGS. 8A/8B are high-level flowcharts illustrating various methods and techniques for pre-fetching and caching storage blocks in a cache of a file-level snapshot access service, according to some embodiments.
Figure 8B:
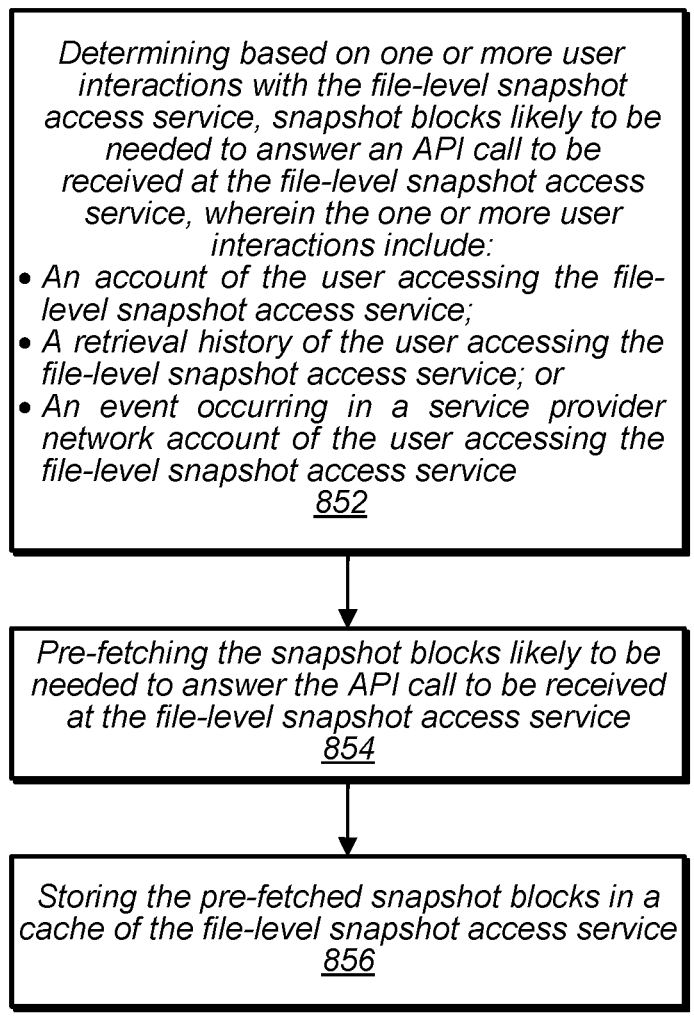

FIGS. 8A/8B are high-level flowcharts illustrating various methods and techniques for pre-fetching and caching storage blocks in a cache of a file-level snapshot access service, according to some embodiments.

At 802, a block streaming service of a file-level snapshot access service stores a list of individual files stored in snapshot blocks of a given point-in-time snapshot. And, at 804, when responding to an API call, the file-level snapshot access service uses the database to answer the API call without retrieving additional blocks. For example, the API all may be a request to list all file included in a given snapshot If such as call was previously made and the corresponding list stored in the database, a subsequent API call to list the files included in the given snapshot may be satisfied by querying the database without having to retrieve additional snapshot blocks from the snapshot archive.

At 852, a pre-fetcher of a block streaming service of file-level snapshot access service determines based on one or more user interactions with the file-level snapshot access service, snapshot blocks likely to be needed to answer an API call to be received at the file-level snapshot access service. Example user interactions that may be used by a pre-fetcher to determine snapshot blocks likely to be needed to answer an API call may include an account of the user accessing the file-level snapshot access service; a retrieval history of the user accessing the file-level snapshot access service, an event occurring in a service provider network account of the user accessing the file-level snapshot access service, amongst various other indicators.

At 854, the pre-fetcher fetches the snapshot blocks likely to be needed to answer the API call to be received at the file-level snapshot access service and at 856 stores pre-fetched snapshot blocks in a cache of the file-level snapshot access service.

Figure 9A:
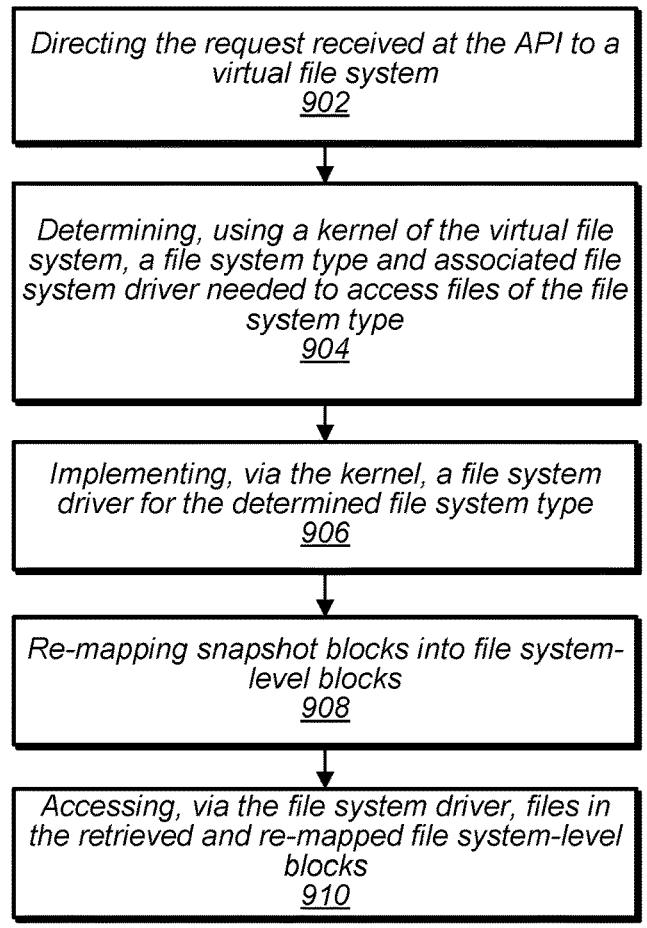
FIGS. 9A/9B are high-level flowcharts illustrating various methods and techniques for implementing a file system driver in a file-level snapshot access service, according to some embodiments.
Figure 9B:
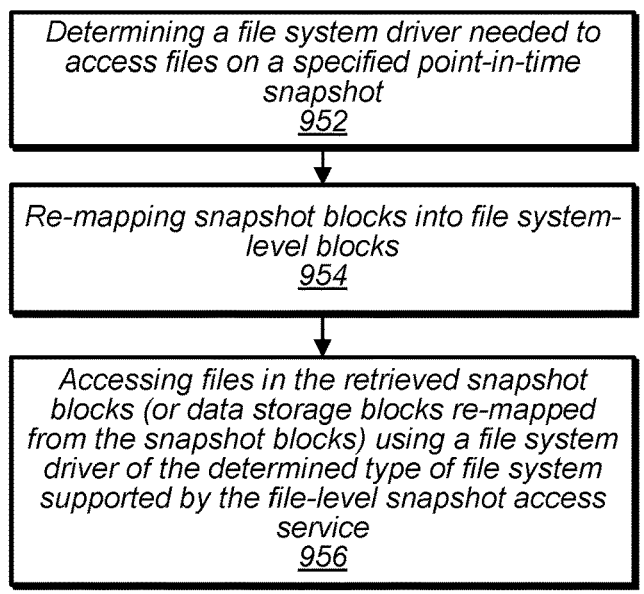

FIGS. 9A/9B are high-level flowcharts illustrating various methods and techniques for implementing a file system driver in a file-level snapshot access service, according to some embodiments.

At 902, the file-level snapshot access service directs a request received at the API (e.g. API 104 or API 106) to a virtual file system. At 904, a kernel of the virtual file system determines a file system type and associated file system driver of a point-in-time snapshot from which the request file needs to be retrieved. Then, at 906, the virtual file system implements the determined file system driver using a file system driver of the kernel. At 908, the block streaming service retrieves and re-maps snapshot blocks into file system level blocks and provides the selected file system driver access to the re-mapped blocks. At 910, the file system driver accesses files in the the retrieved snapshot blocks that have been re-mapped.

Alternatively, instead of using a virtual file system and kernel which may limit a number of concurrent file drivers that may be implemented at a given time, the file-level snapshot access service may implement its own file system drivers.

For example, at 952, the file-level snapshot access service determines a file system driver needed to access files on a specified point-in-time snapshot. At 954, the block streaming service retrieves and re-maps the snapshot blocks into file system level blocks and provides the selected file system driver access to the re-mapped blocks. Then, at 954, the file-level snapshot access service accesses files in the retrieved snapshot blocks (re-mapped to file system-level blocks) using the determined file system driver of the determined type of file system that is supported by the file-level snapshot access service. As mentioned above, if a file system type of the snapshot blocks does not match any of the file system drivers supported by the file-level snapshot access service, a message may be returned that the snapshot is formatted according to an unsupported file system format.

Figure 10:
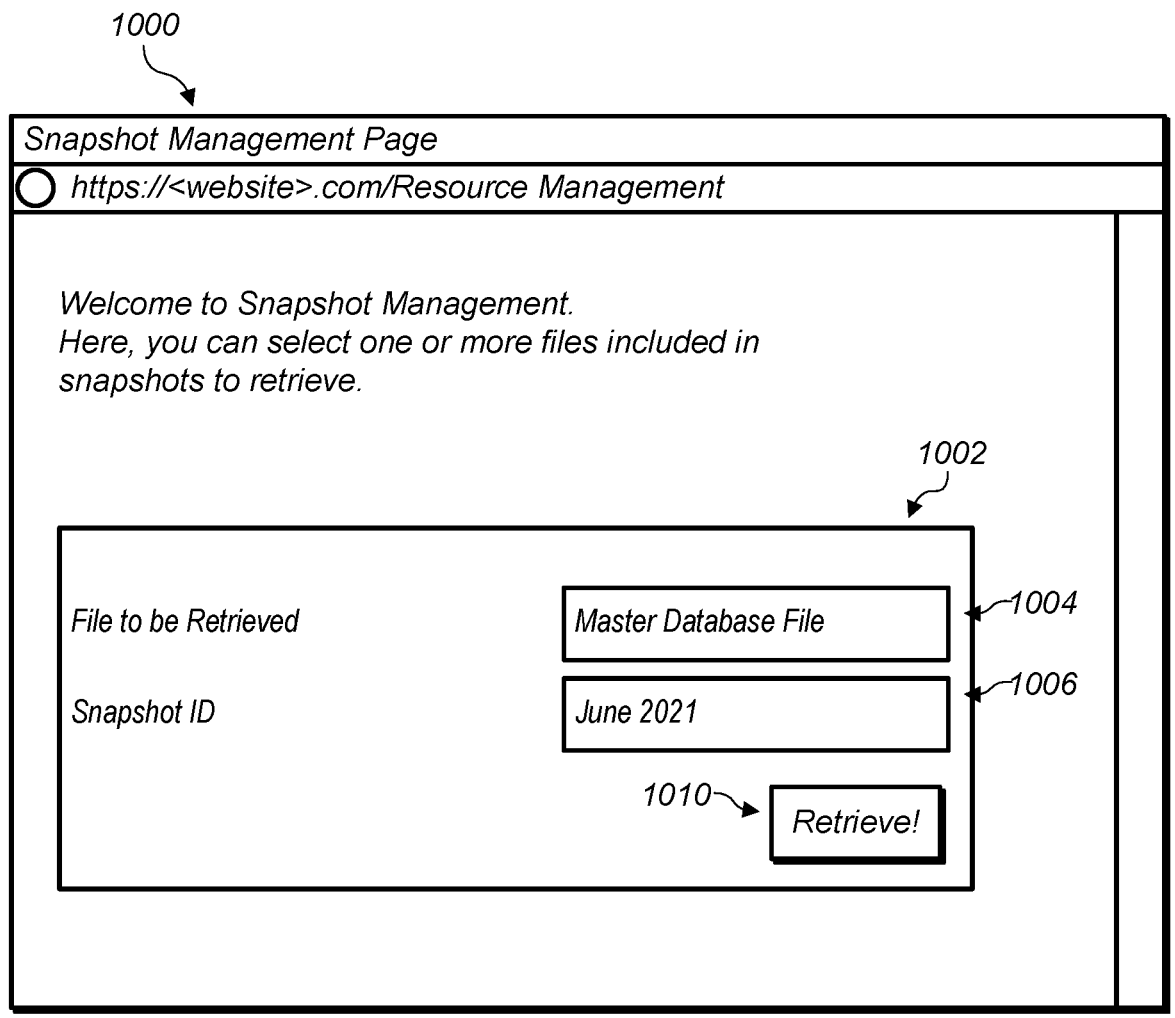
FIG. 10 illustrates an example graphical user interface provided by a user interface for a storage service and/or file-level snapshot access service, wherein the user interface allows a user to specify a particular file to be retrieved from a specified snapshot, according to some embodiments.

FIG. 10 illustrates an example graphical user interface provided by a user interface for a storage service and/or file-level snapshot access service, wherein the user interface allows a user to specify a particular file to be retrieved from a specified snapshot, according to some embodiments.

In some embodiments, storage service user interface 160 illustrated in FIG. 1 may implement the example graphical user interfaces depicted in FIGS. 10-13. Also, in some embodiments, a user interface of file-level snapshot access service 102 may implement the example graphical user interfaces shown in FIGS. 10-13. Also, in some embodiments, the functionality illustrated in the example graphical user interfaces shown in FIGS. 10-13 may be implemented using other interfaces types, such as a command line interface, programmatic interface, user console, etc.

Graphical user interface 1000 includes selection box 1002 which allows a user/client 180 to specify a particular individual file (1004) included in a specified snapshot (1006) that is to be retrieved. Graphical user interface 1000 also includes a button 1010 to initiate retrieval of the specified file in the specified snapshot.

Figure 11A:
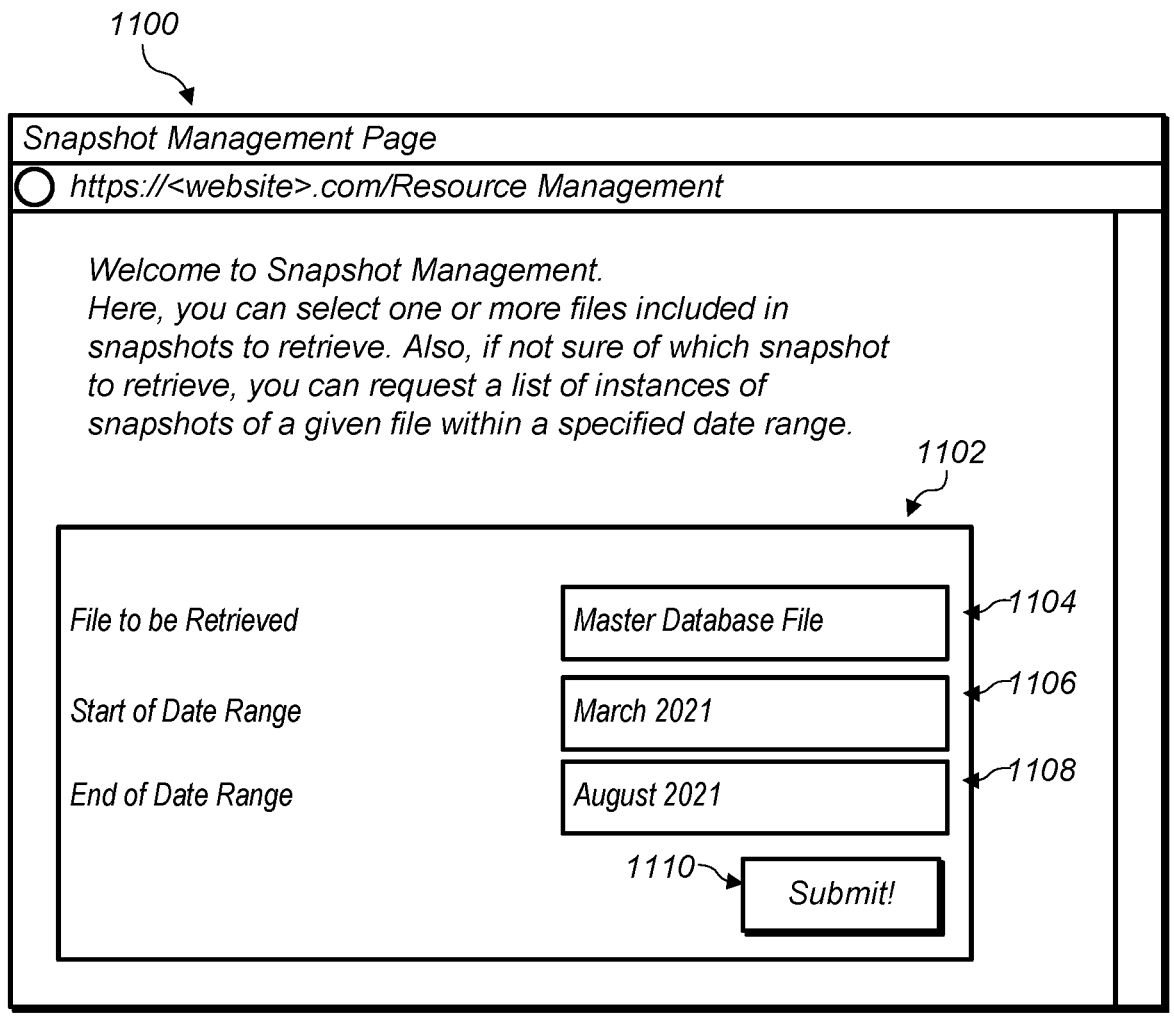
FIG. 11A illustrates an example graphical user interface provided by a user interface for a storage service and/or file-level snapshot access service, wherein the user interface allows a user to specify a particular file to be retrieved from one or more snapshots taken within a specified date range, according to some embodiments.

FIG. 11A illustrates an example graphical user interface provided by a user interface for a storage service and/or file-level snapshot access service, wherein the user interface allows a user to specify a particular file to be retrieved from one or more snapshots taken within a specified date range, according to some embodiments.

Graphical user interface 1100 includes selection box 1102 which allows a user/client 180 to specify a particular individual file (1104) to be retrieved for snapshots within in a specified data range (e.g. from start date (1106) to end date (1108)). Graphical user interface 1100 also includes a button 1110 to submit the query.

Figure 11B:
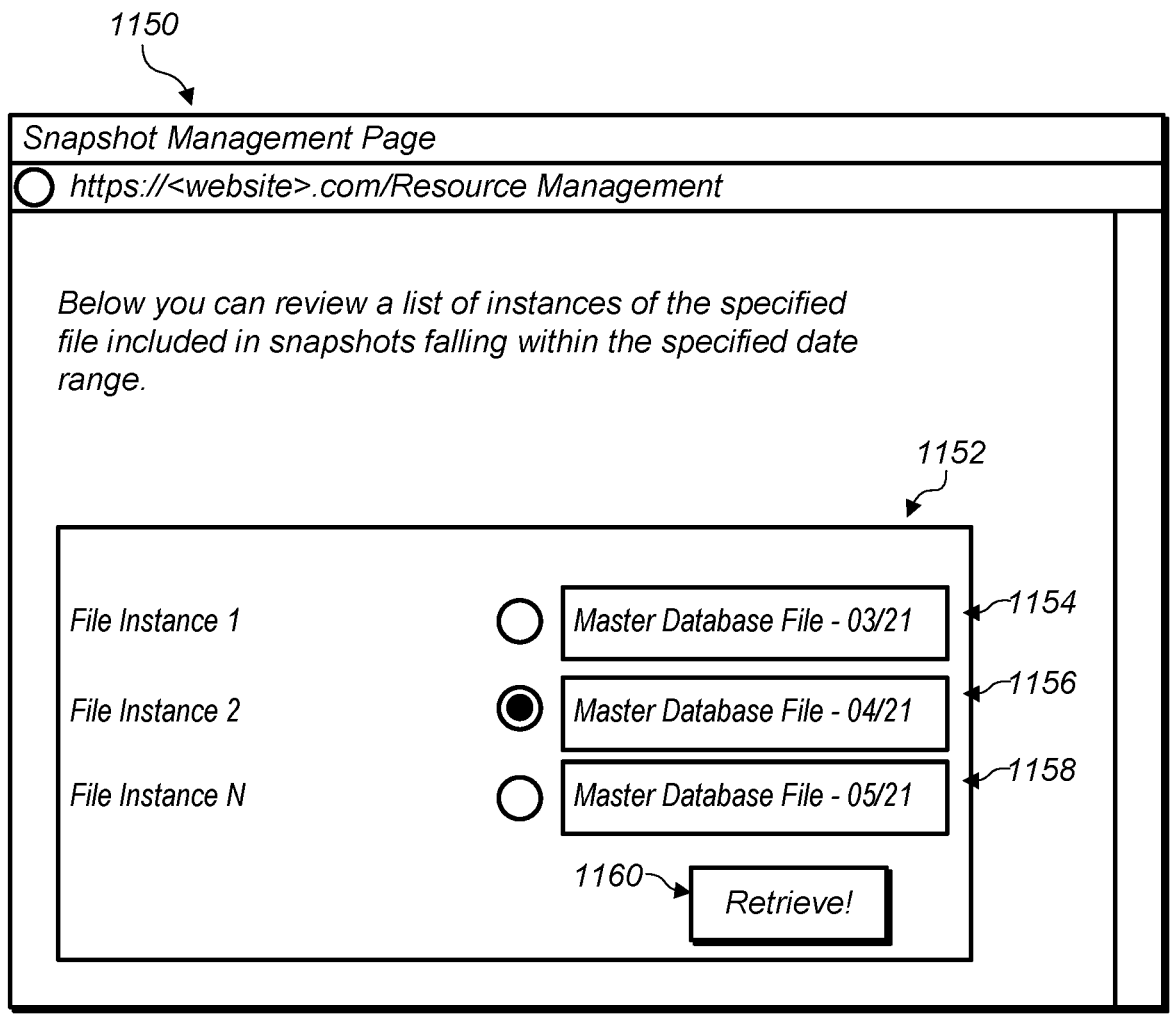
FIG. 11B illustrates an example graphical user interface provided by a user interface for a storage service and/or file-level snapshot access service, wherein the user interface returns instances of the specified file included in snapshots taken within the specified date range and allows a user to select a particular instance of the file to be retrieved from the one or more snapshots taken within the specified date range, according to some embodiments.

FIG. 11B illustrates an example graphical user interface provided by a user interface for a storage service and/or file-level snapshot access service, wherein the user interface returns instances of the specified file included in snapshots taken within the specified date range and allows a user to select a particular instance of the file to be retrieved from the one or more snapshots taken within the specified date range, according to some embodiments.

Graphical user interface 1150 includes selection box 1152 which allows a user/client 180 to select a particular individual file (e.g. 1156) to be retrieved for instances of the file specified in box 1104 of FIG. 11A included in snapshots within in the specified data range (e.g. from start date (1106) to end date (1108)). For example, graphical user interface 1150 has returned a list comprising instances (1154, 1156, and 1158) of the specified file included in snapshots falling within the specified date range. Graphical user interface 1150 also includes a button 1160 to initiate retrieval of the selected instance of the specified file.

Figure 12:
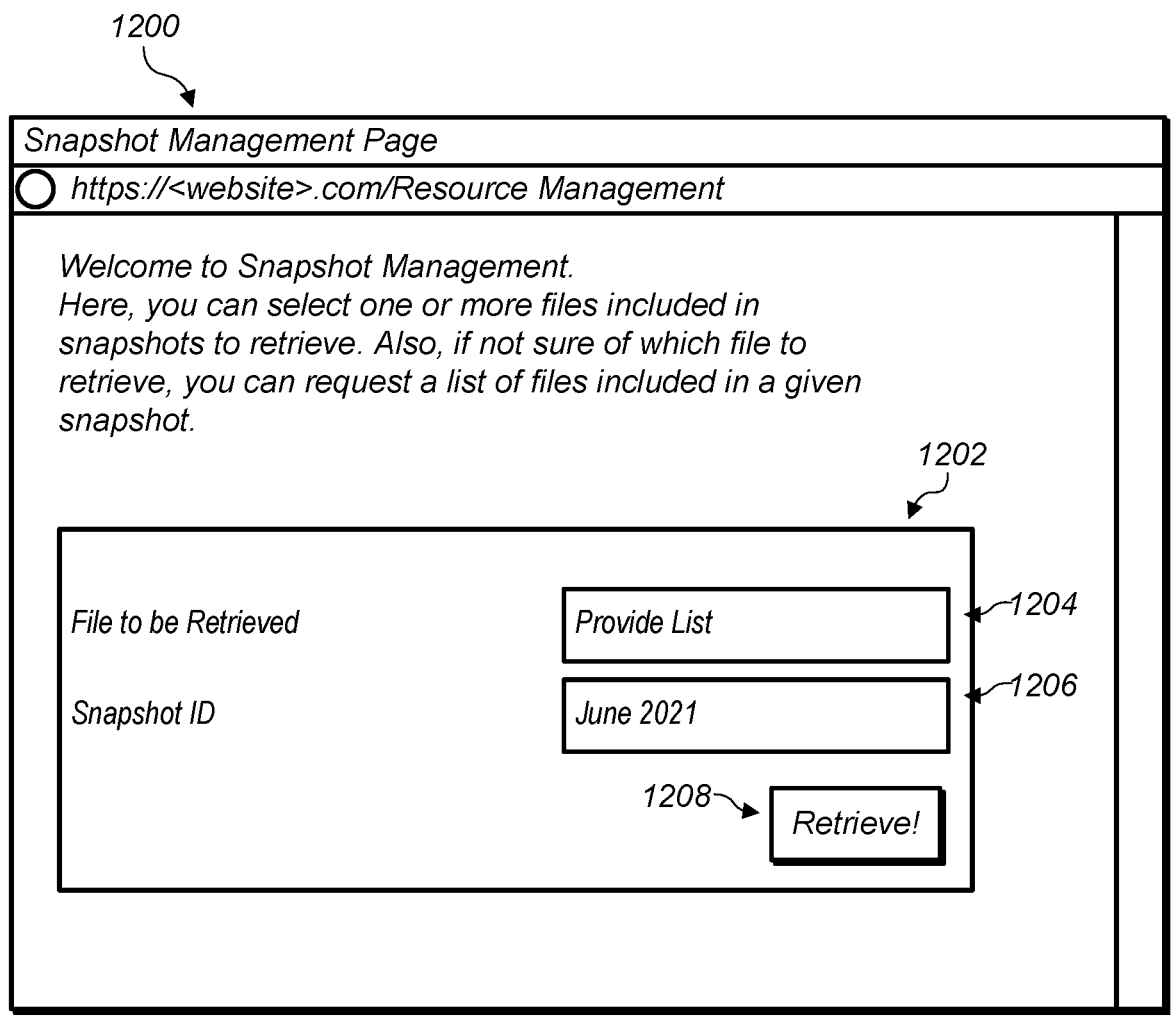
FIG. 12 illustrates an example graphical user interface provided by a user interface for a storage service and/or file-level snapshot access service, wherein the user interface allows a user to request a list of files included in a specified snapshot, according to some embodiments.

FIG. 12 illustrates an example graphical user interface provided by a user interface for a storage service and/or file-level snapshot access service, wherein the user interface allows a user to request a list of files included in a specified snapshot, according to some embodiments.

Graphical user interface 1200 includes selection box 1202 which allows a user/client 180 to specify a list files option (1204) for a specified snapshot (1206). Graphical user interface 1200 also includes a button 1208 to initiate retrieval of the list of files included in the specified snapshot.

Figure 13:
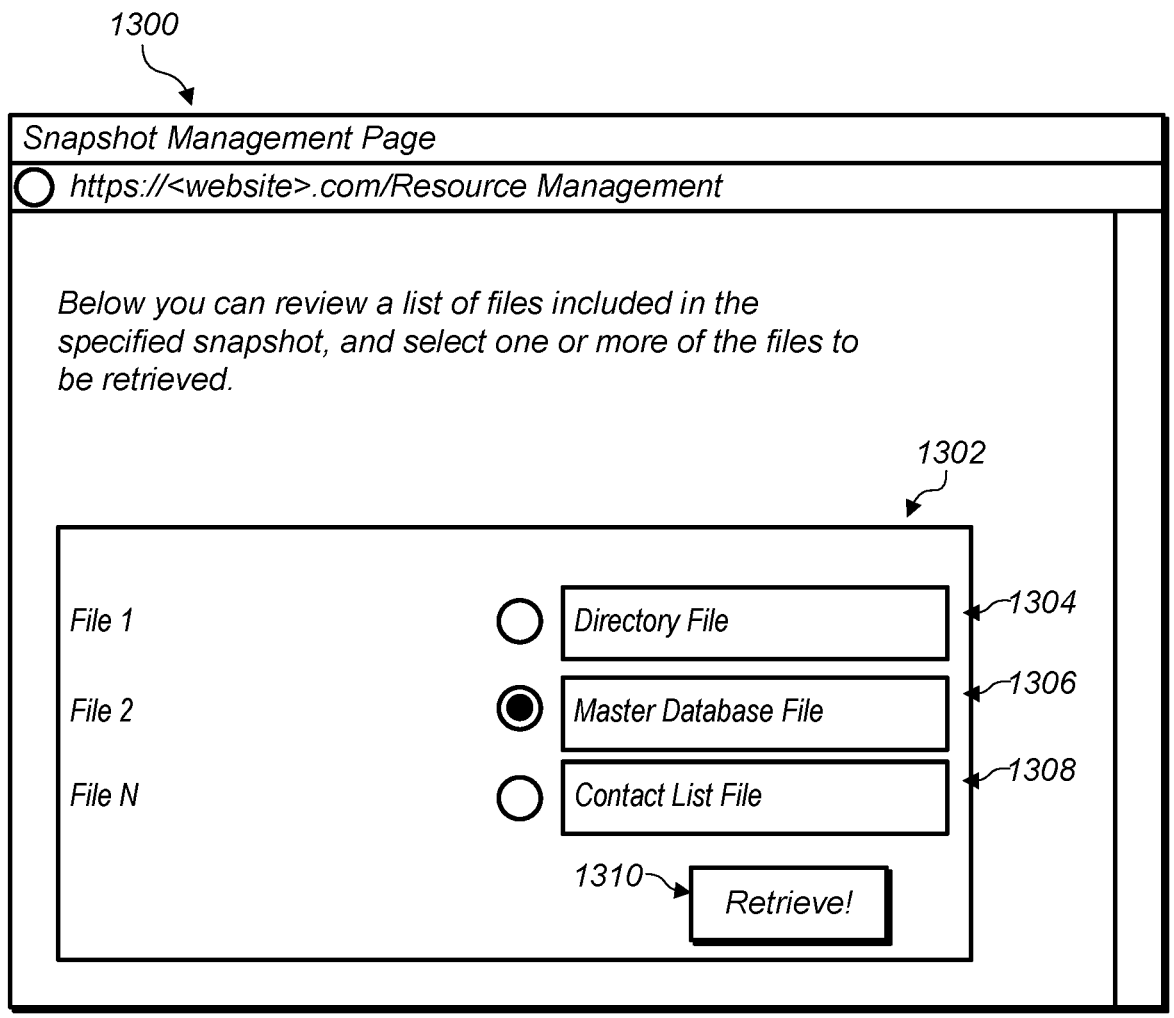
FIG. 13 illustrates an example graphical user interface provided by a user interface for a storage service and/or file-level snapshot access service, wherein the user interface returns a list of files included in the specified snapshot and allows a user to select a particular files to be retrieved from the specified snapshot, according to some embodiments.

FIG. 13 illustrates an example graphical user interface provided by a user interface for a storage service and/or file-level snapshot access service, wherein the user interface returns a list of files included in the specified snapshot and allows a user to select a particular files to be retrieved from the specified snapshot, according to some embodiments.

Graphical user interface 1300 includes selection box 1302 which allows a user/client 180 to select a particular individual file (e.g. 1306) to be retrieved for files included in the list of files for the specified snapshot (e. g. snapshot specified in box 1206). For example, graphical user interface 1300 has returned a list comprising files (1304, 1306, and 1308) included in the specified snapshot. Graphical user interface 1300 also includes a button 1310 to initiate retrieval of the selected file.

Figure 14:
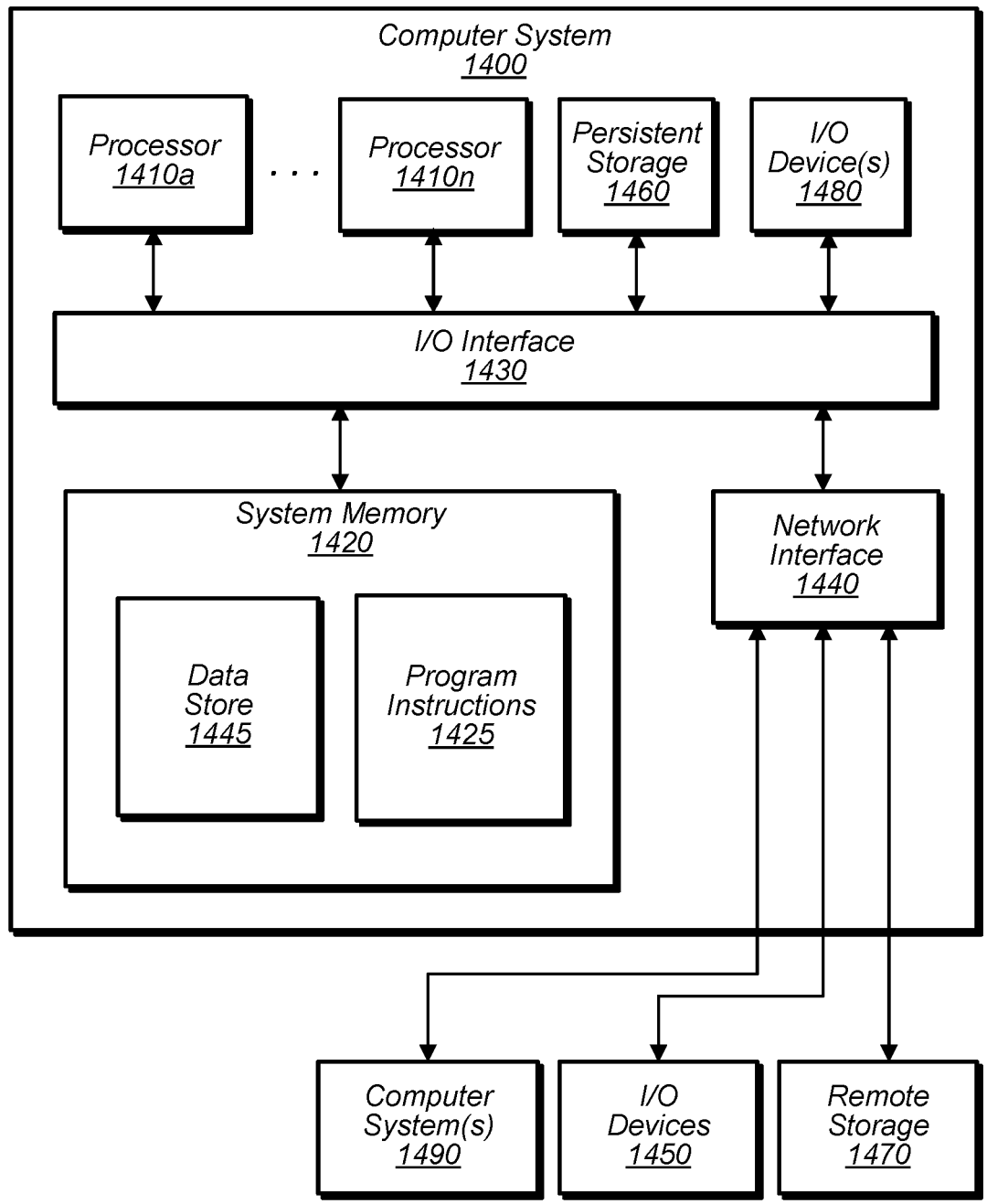
FIG. 14 is a block diagram illustrating an example computing system, according to some embodiments.

FIG. 14 is a block diagram illustrating an example computing system, according to some embodiments. For example, computer system 1400 may be configured to implement storage and/or compute nodes of a compute cluster, a data stores, and/or a client, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, block-based storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a resource host, in different embodiments. In some embodiments, program instructions 1425 may implement multiple separate clients, nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. In general, system memory 1420 (e.g., data store 1445 within system memory 1420), persistent storage 1460, and/or remote storage 1470 may store data blocks, replicas of data blocks, metadata associated with data blocks and/or their state, configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490, for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network, comprising:
   a set of resource hosts configured to implement a snapshot archive; and
   one or more computer systems configured to implement a file-level snapshot access service, wherein to implement the file-level snapshot access service, the one or more computer systems are configured to:
   provide a file-level snapshot access application programmatic interface (API) configured to receive a request related to retrieving one or more files included in a snapshot stored in the snapshot archive; and
   automatically perform, in response to receiving the request:
   retrieving a sub-set of snapshot blocks from the snapshot stored in the snapshot archive, the sub-set of snapshot blocks comprising the one or more files;
   identifying the one or more files included in the one or more snapshot blocks; and
   returning, in response to the request related to retrieving the one or more files included in the snapshot, an indication the one or more files are identified.

2. The provider network of claim 1, wherein:
   the request is a request specifying a time range and one or more files to be queried in the specified time range.

3. The provider network of claim 2, wherein:
   in response to receiving the request specifying the time range and the one or more files to be queried in the specified time range, the one or more computer systems implementing the file-level snapshot access service automatically perform:
   determining one or more snapshots within the specified time range;
   issuing one or more API calls to the file-level snapshot access API specifying the one or more files and specifying the one or more determined snapshots; and
   returning a list comprising one or more identified instances of the queried one or more files included in the determined snapshots.

4. The provider network of claim 3, wherein in response to receiving the request specifying the time range and the one or more files to be queried in the specified time range, the one or more computer systems implementing the file-level snapshot access service further automatically perform:
   providing a user-interface configured to receive a selection of a particular one or more instances of the one or more files from the list comprising the one or more identified instances of the queried one or more files included in the determined snapshots;
   receiving, via the user-interface, the selection of the particular one or more instances of the one or more files from the list comprising the queried one or more files included in the determined snapshots; and
   returning, in response to the selection, the selected particular one or more instances of the one or more files from the list comprising the queried one or more files included in the determined snapshots.

5. The provider network of claim 1 wherein:
   the request is a request specifying an individual file to be queried; and the one or more computer systems implementing the file-level snapshot access service are further configured to automatically perform in response to receiving the request specifying an individual file to be queried:
   returning the one or more files.

6. The provider network of claim 1, wherein:
the request is a request to list files included in the snapshot; and
the one or more computer systems implementing the file-level snapshot access service are further configured to automatically perform in response to receiving the request to list files included in the snapshot:
   generating a list of files included in the snapshot; and
   returning, in response to the request to list files included in the snapshot, the list of files included in the snapshot.

7. The provider network of claim 6, wherein in response to receiving the request to list files included in the snapshot, the one or more computer systems configured to implement the file-level snapshot access service further automatically perform:
   providing a user-interface configured to receive a selection of a particular one or more of the files from the list of files included in the snapshot;
   receiving, via the user-interface, the selection of the particular one or more of the files from the list of files included in the snapshot; and
   returning, in response to the selection, the selected particular one or more of the files from the list of files included in the snapshot.

8. A method, comprising:
providing an application programmatic interface (API) for a file-level snapshot access service, the API configured to receive a request related to retrieving one or more files included in a snapshot stored in a snapshot archive; and
automatically performing in response to receiving the request:
   retrieving a sub-set of snapshot blocks of the snapshot from the snapshot archive;
   identifying one or more instances of the one or more files included in the sub-set of snapshot blocks retrieved from the snapshot archive; and
   returning, in response to the request, an indication that the one or more instances of the one or more files included in the sub-set of the snapshot blocks are identified.

9. The method of claim 8, wherein the request is a request specifying a time range and one or more files to be queried in the specified time range.

10. The method of claim 9, further comprising:
determining one or more snapshots within the specified time range;
issuing one or more API calls to the file-level snapshot access API specifying the one or more files and specifying the one or more determined snapshots; and
returning a list comprising one or more identified instances of the queried one or more files included in the determined snapshots.

11. The method of claim 10, further comprising:
providing a user-interface configured to receive a selection of a particular one or more instances of the one or more files from the list comprising the one or more identified instances of the queried one or more files included in the determined snapshots;
receiving, via the user-interface, the selection of the particular one or more instances of the one or more files from the list comprising the queried one or more files included in the determined snapshots; and
returning, in response to the selection, the selected particular one or more instances of the one or more files from the list comprising the queried one or more files included in the determined snapshots.

12. The method of claim 8, wherein the request is a request to retrieve one or more files from the snapshot, and further comprising:
   returning, in response to the request to retrieve the one or more files from the snapshot, the one or more files.

13. The method of claim 8, wherein the request is a request to list files included in the snapshot, and further comprising:
   generating a list of files included in the snapshot; and
   returning, in response to the request to list files included in the snapshot, the list of files included in the snapshot.

14. The method of claim 13, further comprising:
   providing a user-interface configured to receive a selection of a particular one or more of the files from the list of files included in the snapshot;
   receiving, via the user-interface, the selection of the particular one or more of the files from the list of files included in the snapshot; and
   returning, in response to the selection, the selected particular one or more of the files from the list of files included in the snapshot.

15. One or more non-transitory, computer-readable, media storing program instructions, that when executed on, or across, one or more computing devices, cause the one or more computing devices to:
   provide an application programmatic interface (API) for a file-level snapshot access service, the API configured to receive a request related to retrieving one or more files included in a snapshot stored in a snapshot archive; and
   automatically perform in response to receiving the request:
      retrieving a sub-set of snapshot blocks of the snapshot from the snapshot archive;
      identifying one or more instances of the one or more files included in the sub-set of snapshot blocks; and
      returning an indication that the one or more instances of the one or more files included in the sub-set of snapshot blocks are identified.

16. The one or more non-transitory, computer readable, media of claim 15, wherein:
the request is a request specifying a time range and one or more files to be queried in the specified time range; and
the program instructions, when executed on or across the one or more processors, further cause the one or more processors to:
   determine one or more snapshots within the specified time range;
   issue one or more API calls to the file-level snapshot access API specifying the one or more files and specifying the one or more determined snapshots; and
   return a list comprising one or more identified instances of the queried one or more files included in the determined snapshots.

17. The one or more non-transitory, computer readable, media of claim 16, wherein the program instructions, when executed on or across the one or more processors, further cause the one or more processors to:
   provide a user-interface configured to receive a selection of a particular one or more instances of the one or more files from the list comprising the one or more identified instances of the queried one or more files included in the determined snapshots;

receive, via the user-interface, the selection of the particular one or more instances of the one or more files from the list comprising the queried one or more files included in the determined snapshots; and return, in response to the selection, the selected particular one or more instances of the one or more files from the list comprising the queried one or more files included in the determined snapshots.

18. The one or more non-transitory, computer readable, media of claim 15, wherein:

the request is a request to retrieve one or more files from the snapshot; and the program instructions, when executed on or across the one or more processors, further cause the one or more processors to:

return, in response to the request to retrieve the one or more files from the snapshot, the one or more files.

19. The one or more non-transitory, computer-readable, media of claim 15, wherein:

the request is a request to list files included in the snapshot; and the program instructions, when executed on or across the one or more processors, further cause the one or more processors to:

generate a list of files included in the snapshot; and return, in response to the request to list files included in the snapshot, the list of files included in the snapshot.

20. The one or more non-transitory, computer readable, media of claim 19, wherein the program instructions, when executed on or across the one or more processors, further cause the one or more processors to:

provide a user-interface configured to receive a selection of a particular one or more of the files from the list of files included in the snapshot;

receive, via the user-interface, the selection of the particular one or more of the files from the list of files included in the snapshot; and return, in response to the selection, the selected particular one or more of the files from the list of files included in the snapshot.

* * * * *